United States Patent
Min et al.

(10) Patent No.: US 10,356,425 B2
(45) Date of Patent: Jul. 16, 2019

(54) VIDEO ENCODING METHOD AND APPARATUS, OR VIDEO DECODING METHOD AND APPARATUS THAT PERFORM INTRA PREDICTION BASED ON ONE OR MORE SAMPLE VALUES AND ONE OR MORE PATTERNS THAT ARE DETERMINED WITH RESPECT TO BLOCK

(71) Applicant: SAMSUNG ELECTRONICS CO., LTD., Suwon-si (KR)

(72) Inventors: Jung-hye Min, Yongin-si (KR); Elena Alshina, Suwon-si (KR); Mikhail Mishurovskiy, Suwon-si (KR); Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 15/588,167

(22) Filed: May 5, 2017

(65) Prior Publication Data
US 2017/0244974 A1    Aug. 24, 2017

Related U.S. Application Data

(63) Continuation of application No. PCT/KR2015/011816, filed on Nov. 4, 2015.
(Continued)

(51) Int. Cl.
*H04N 19/176* (2014.01)
*H04N 19/107* (2014.01)
(Continued)

(52) U.S. Cl.
CPC ......... *H04N 19/176* (2014.11); *H04N 19/107* (2014.11); *H04N 19/117* (2014.11); *H04N 19/167* (2014.11)

(58) Field of Classification Search
CPC .. H04N 19/176; H04N 19/117; H04N 19/167; H04N 19/107
See application file for complete search history.

(56) References Cited

U.S. PATENT DOCUMENTS 9,521,421 B2    12/2016  Cheon et al.
2006/0291567 A1* 12/2006 Filippini ................ H04N 19/51
                                              375/240.24
(Continued)

FOREIGN PATENT DOCUMENTS

KR    10-2011-0017721 A    2/2011
KR    10-2011-0019856 A    3/2011
(Continued)

OTHER PUBLICATIONS

Kim et al., "Block Partitioning Structure in the HEVC Standard", IEEE Transactions on Circuits and Systems for Video Technology, Vo. 22, No. 12, Dec. 2012. (24 pages total).
(Continued)

*Primary Examiner* — Nam D Pham
(74) *Attorney, Agent, or Firm* — Sughrue Mion, PLLC

(57) ABSTRACT

Provided is an image encoding method including determining at least one sample value related to a first block, based on sample values of previously-reconstructed reference samples; determining at least one pattern in which samples of the first block are to be arranged; generating one or more candidate prediction blocks for the first block, based on the at least one sample value and the at least one pattern; and determining prediction values of the samples of the first block, based on one of the one or more candidate prediction blocks.

14 Claims, 32 Drawing Sheets

Related U.S. Application Data

(60) Provisional application No. 62/075,377, filed on Nov. 5, 2014.

(51) Int. Cl.
*H04N 19/117* (2014.01)
*H04N 19/167* (2014.01)

(56) References Cited

U.S. PATENT DOCUMENTS

| | | |
|---|---|---|
| 2012/0201295 A1 | 8/2012 | Kim et al. |
| 2014/0321542 A1 | 10/2014 | Lim et al. |
| 2015/0124880 A1 | 5/2015 | Kim et al. |

FOREIGN PATENT DOCUMENTS

| | | |
|---|---|---|
| KR | 10-2013-0020562 A | 2/2013 |
| KR | 10-2013-0105114 A | 9/2013 |
| KR | 10-2013-0118219 A | 10/2013 |
| WO | 2014/139049 A1 | 9/2014 |

OTHER PUBLICATIONS

Communication dated Feb. 25, 2016 by the International Searching Authority in counterpart International Patent Application No. PCT/KR2015/011816.

\* cited by examiner

VIDEO ENCODING METHOD AND APPARATUS, OR VIDEO DECODING METHOD AND APPARATUS THAT PERFORM INTRA PREDICTION BASED ON ONE OR MORE SAMPLE VALUES AND ONE OR MORE PATTERNS THAT ARE DETERMINED WITH RESPECT TO BLOCK

TECHNICAL FIELD

The present disclosure relates to a method and apparatus for using a sample value and a pattern which are determined with respect to a block, whereby prediction values of samples of a current block are determined when an image is encoded or decoded.

BACKGROUND ART

Image data is encoded by using a codec based on predetermined data compression standards, e.g., the Moving Picture Experts Group (MPEG) standards, and then the image data in the form of a bitstream is stored in a recording medium or is transmitted via a communication channel.

Due to development and supply of hardware capable of reproducing and storing high-resolution or high-quality image content, there is an increasing demand for a codec capable of effectively encoding or decoding the high-resolution or high-quality image content. Encoded image content is decoded and then is reproduced. Recently, methods of effectively compressing the high-resolution or high-quality image content are being used. For example, an efficient image compression method involving processing an encoding-target image by using an arbitrary method is being used.

DETAILED DESCRIPTION OF THE INVENTION

Technical Problem

In a high-resolution image, there is a probability that samples included in each of blocks have similar sample values other than samples in an area having particular directionality. When intra prediction is performed to compress an image, there is a lack of prediction modes without directionality, except for an angular mode in which a sample prediction value having directionality in a particular direction is determined, and thus, compression efficiency of the high-resolution image may deteriorate.

Technical Solution

According to an aspect of the present disclosure, there is provided an image encoding method including determining at least one sample value related to a first block, based on sample values of previously-reconstructed reference samples; determining at least one pattern in which samples of the first block are to be arranged; generating one or more candidate prediction blocks for the first block, based on the at least one sample value and the at least one pattern; and determining prediction values of the samples of the first block, based on one of the one or more candidate prediction blocks.

According to another aspect of the present disclosure, there is provided an image decoding method including determining at least one sample value related to a first block, based on sample values of previously-reconstructed reference samples; determining at least one pattern in which samples of the first block are to be arranged; generating one or more candidate prediction blocks for the first block, based on the at least one sample value and the at least one pattern; and determining prediction values of the samples of the first block, based on one of the one or more candidate prediction blocks.

According to another aspect of the present disclosure, there is provided an image encoding apparatus including a sample value determiner configured to determine at least one sample value related to a first block, based on sample values of previously-reconstructed reference samples; a pattern determiner configured to determine at least one pattern in which samples of the first block are to be arranged; a candidate prediction block generator configured to generate one or more candidate prediction blocks for the first block, based on the sample value and the at least one pattern; and a prediction value determiner configured to determine prediction values of the samples included in the first block, based on one of the one or more candidate prediction blocks.

According to another aspect of the present disclosure, there is provided an image decoding apparatus including a sample value determiner configured to determine at least one sample value related to a first block, based on sample values of previously-reconstructed reference samples; a pattern determiner configured to determine at least one pattern in which samples of the first block are to be arranged; a candidate prediction block generator configured to generate one or more candidate prediction blocks for the first block, based on the sample value and the at least one pattern; and a prediction value determiner configured to determine prediction values of the samples included in the first block, based on one of the one or more candidate prediction blocks.

According to another aspect of the present disclosure, there is provided a non-transitory computer-readable recording medium including a program for implementing the image decoding method.

Advantageous Effects

According to an embodiment, an image is encoded or decoded by performing intra prediction based on a sample value and a pattern which are determined with respect to a block, and by doing so, compression efficiency of a high-resolution image may be improved.

BEST MODE

Figure 1A:
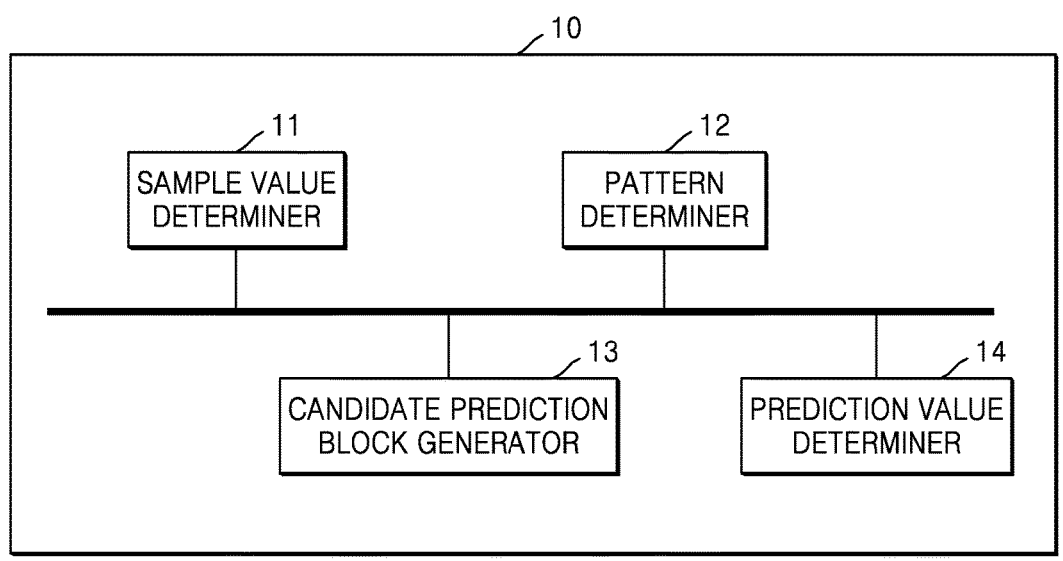
FIG. 1A illustrates a block diagram of an image encoding apparatus capable of performing a method of encoding an image, according to an embodiment.

According to an aspect of the present disclosure, there is provided an image encoding method including determining at least one sample value related to a first block, based on sample values of previously-reconstructed reference samples; determining at least one pattern in which samples of the first block are to be arranged; generating one or more candidate prediction blocks for the first block, based on the at least one sample value and the at least one pattern; and determining prediction values of the samples of the first block, based on one of the one or more candidate prediction blocks.

The determining of the at least one sample value may include determining the at least one sample value by using the previously-reconstructed reference samples located adjacent to the first block.

The reference samples including the previously-reconstructed reference samples may be included in at least one block from among adjacent blocks of the first block or a second block including the first block.

The determining of the at least one pattern may include determining a location of a sample having the at least one sample value in the first block; and determining sample values and locations of other samples included in the first block, based on the location of the sample.

The image encoding method may further include generating a bitstream including first information indicating whether to determine the prediction values by using the one or more candidate prediction blocks, based on at least one of a block, a slice segment, a slice, a frame, and a sequence.

The image encoding method may further include performing flat filtering on at least one adjacent block close to the first block, and samples adjacent to a boundary of the first block.

According to another aspect of the present disclosure, there is provided an image decoding method including determining at least one sample value related to a first block, based on sample values of previously-reconstructed reference samples; determining at least one pattern in which samples of the first block are to be arranged; generating one or more candidate prediction blocks for the first block, based on the at least one sample value and the at least one pattern; and determining prediction values of the samples of the first block, based on one of the one or more candidate prediction blocks.

The determining of the at least one sample value may include determining the at least one sample value by using the previously-reconstructed reference samples located adjacent to the first block.

The reference samples including the previously-reconstructed reference samples may be included in at least one block from among adjacent blocks of the first block or a second block including the first block.

The determining of the at least one pattern may include determining a location of a sample having the at least one sample value in the first block; and determining sample values and locations of other samples included in the first block, based on the location of the sample.

The image decoding method may further include obtaining a bitstream including first information indicating whether to determine the prediction values by using the one or more candidate prediction blocks, based on at least one of a block, a slice segment, a slice, a frame, and a sequence.

The image decoding method may further include performing flat filtering on at least one adjacent block close to the first block, and samples adjacent to a boundary of the first block.

According to another aspect of the present disclosure, there is provided an image encoding apparatus including a sample value determiner configured to determine at least one sample value related to a first block, based on sample values of previously-reconstructed reference samples; a pattern determiner configured to determine at least one pattern in which samples of the first block are to be arranged; a candidate prediction block generator configured to generate one or more candidate prediction blocks for the first block, based on the sample value and the at least one pattern; and a prediction value determiner configured to determine prediction values of the samples included in the first block, based on one of the one or more candidate prediction blocks.

According to another aspect of the present disclosure, there is provided an image decoding apparatus including a sample value determiner configured to determine at least one sample value related to a first block, based on sample values of previously-reconstructed reference samples; a pattern determiner configured to determine at least one pattern in which samples of the first block are to be arranged; a candidate prediction block generator configured to generate one or more candidate prediction blocks for the first block, based on the sample value and the at least one pattern; and a prediction value determiner configured to determine prediction values of the samples included in the first block, based on one of the one or more candidate prediction blocks.

According to another aspect of the present disclosure, there is provided a non-transitory computer-readable recording medium including a program for implementing the image decoding method.

Mode of the Invention

Hereinafter, with reference to FIGS. 1A through 6, an image encoding method or an image decoding method according to various embodiments is provided. In addition, with reference to FIGS. 7 through 19, a video encoding technique and a video decoding technique based on coding units of a tree structure according to various embodiments which are applicable to the image encoding method and the image decoding method are provided. Also, with reference to FIGS. 20 through 26, various embodiments to which the video encoding method and the video decoding method may be applied are provided.

Hereinafter, an "image" may refer to a still image or a moving image of a video, or a video itself.

Hereinafter, a "sample" refers to data that is assigned to a sampling location of an image and is to be processed. For example, a pixel value in an image of a spatial domain, and transform coefficients in a transform domain may be samples.

Hereinafter, a "block" may refer to a unit by which image change is performed on an image according to random processing when the image is encoded or decoded. The block may be the unit that corresponds to a processing unit (e.g., a sequence, a frame, a slice, a largest coding unit, or a coding unit) used in an encoding or decoding process according to the related art, but the disclosure is not limited thereto, and thus the block may correspond to a separate unit different from the processing units.

FIG. 1A illustrates a block diagram of an image encoding apparatus 10 capable of performing a method of encoding an image, according to an embodiment.

The image encoding apparatus 10 according to an embodiment may include a sample value determiner 11, a pattern determiner 12, a candidate prediction block generator 13, and a prediction value determiner 14. With reference to detailed embodiments below, an operation of each element of the image encoding apparatus 10 will now be described.

Figure 2A:
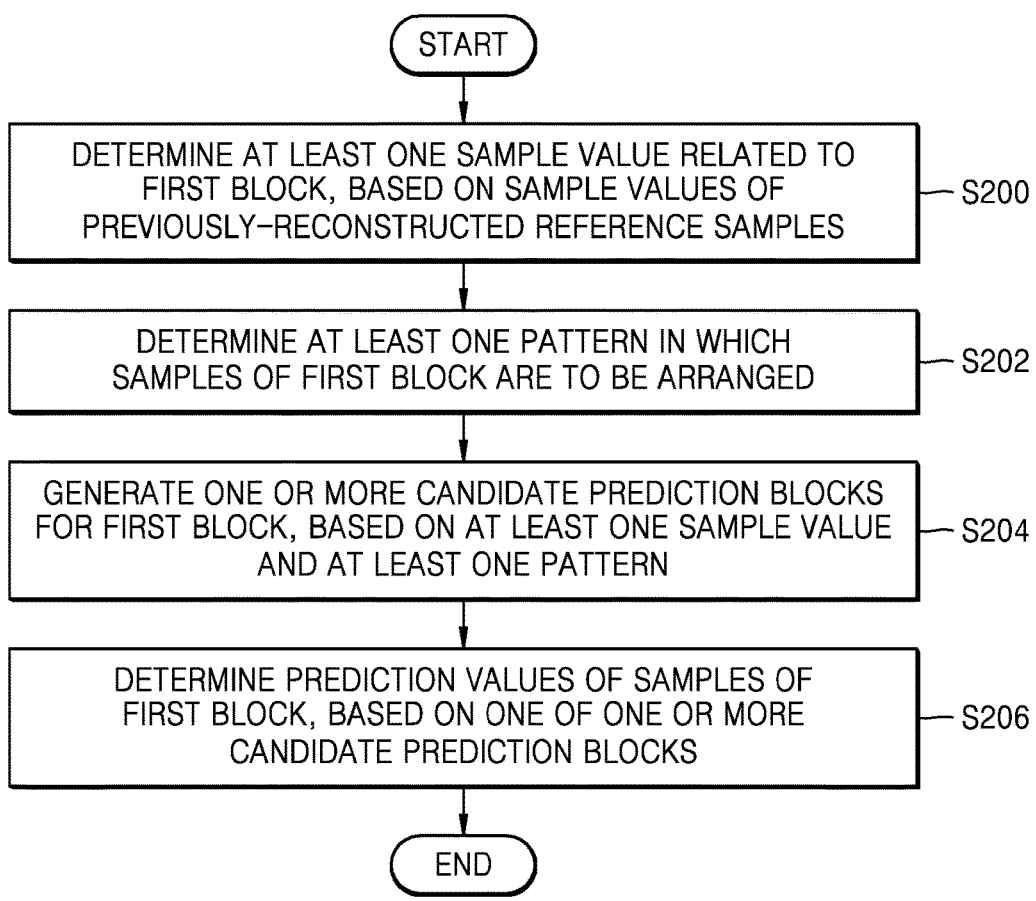
FIG. 2A shows a flowchart of a process of determining prediction values of samples of a first block by using a previously-reconstructed sample so as to encode an image, the process being performed by the image encoding apparatus, according to an embodiment.

FIG. 2A shows a flowchart of a process of determining prediction values of samples of a first block by using a previously-reconstructed sample so as to encode an image, the process being performed by the image encoding apparatus 10, according to an embodiment.

In operation S200, the sample value determiner 11 of the image encoding apparatus 10 may determine at least one sample value related to the first block, based on sample values of previously-reconstructed reference samples.

According to an embodiment, the sample value determiner 11 may use the sample values of the previously-reconstructed samples so as to predict samples of the first block that is not yet reconstructed. The sample value determiner 11 may determine the at least one sample value related to the first block by referring to previously-reconstructed samples adjacent to the first block. The at least one sample value related to the first block may be a representative value for indicating the first block. For example, the sample value determiner 11 may determine the at least one sample value for indicating the first block by calculating an average value and a standard deviation of the previously-reconstructed samples adjacent to the first block. Samples adjacent to the first block, which are referred to by the sample value determiner 11 to determine one or more samples related to the first block, may be defined as a reference sample of the first block. According to an embodiment, the sample value determiner 11 of the image encoding apparatus 10 may determine a location of a sample having the at least one sample value in the first block, and may determine sample values of other samples of the first block, based on the location of the sample having the at least one sample value.

Figure 3A:
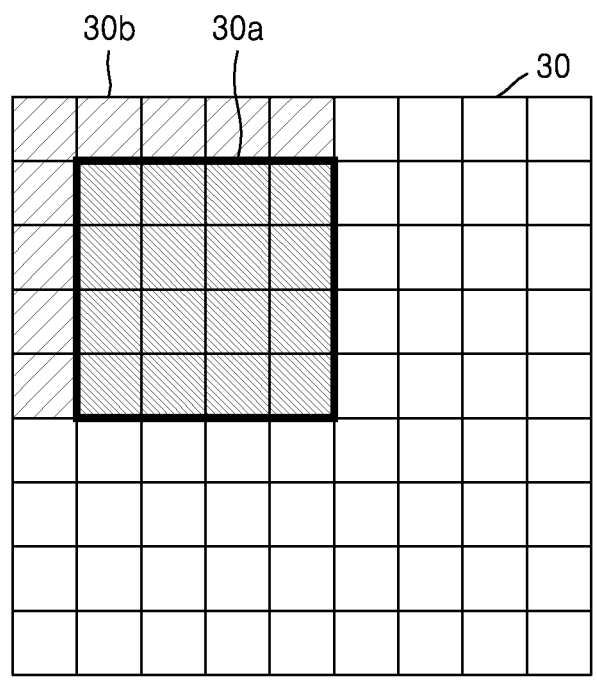
FIG. 3A is a diagram for describing a process of using a previously-reconstructed block adjacent to a first block, according to an embodiment.

FIG. 3A is a diagram for describing a process of using a previously-reconstructed block adjacent to a first block 30a, according to an embodiment.

According to an embodiment, the sample value determiner 11 of the image encoding apparatus 10 may refer to a previously-reconstructed sample 30b that is adjacent to the first block 30a and is included in a frame 30. Because the previously-reconstructed sample 30b to be referred to by the sample value determiner 11 is already reconstructed, the previously-reconstructed sample 30b may include information about each sample value. According to an image encoding method, a location of reconstructed samples with respect to the first block 30a may be limited. For example, when a process of encoding an image is performed in a manner that a plurality of blocks split from the frame 30 of the image are sequentially encoded from the top left to the bottom right of the each of the plurality of blocks, samples adjacent to the right, the bottom, and the bottom right of the first block 30a cannot be previously-reconstructed samples in a process of encoding the first block 30a. In this case, referring to FIG. 3A, the sample value determiner 11 may refer to sample values of reconstructed samples adjacent to the first block 30a, the reconstructed samples being in a location of at least one of the left, the above, and the upper left of the first block 30a. However, the method of determining at least one sample value related to the first block 30a by using the previously-reconstructed sample 30b adjacent to the first block 30a is merely an embodiment, thus, a method of determining at least one sample value is not limited to the embodiment and thus may be construed as various methods that are obvious to one of ordinary skill in the art.

Figure 3B:
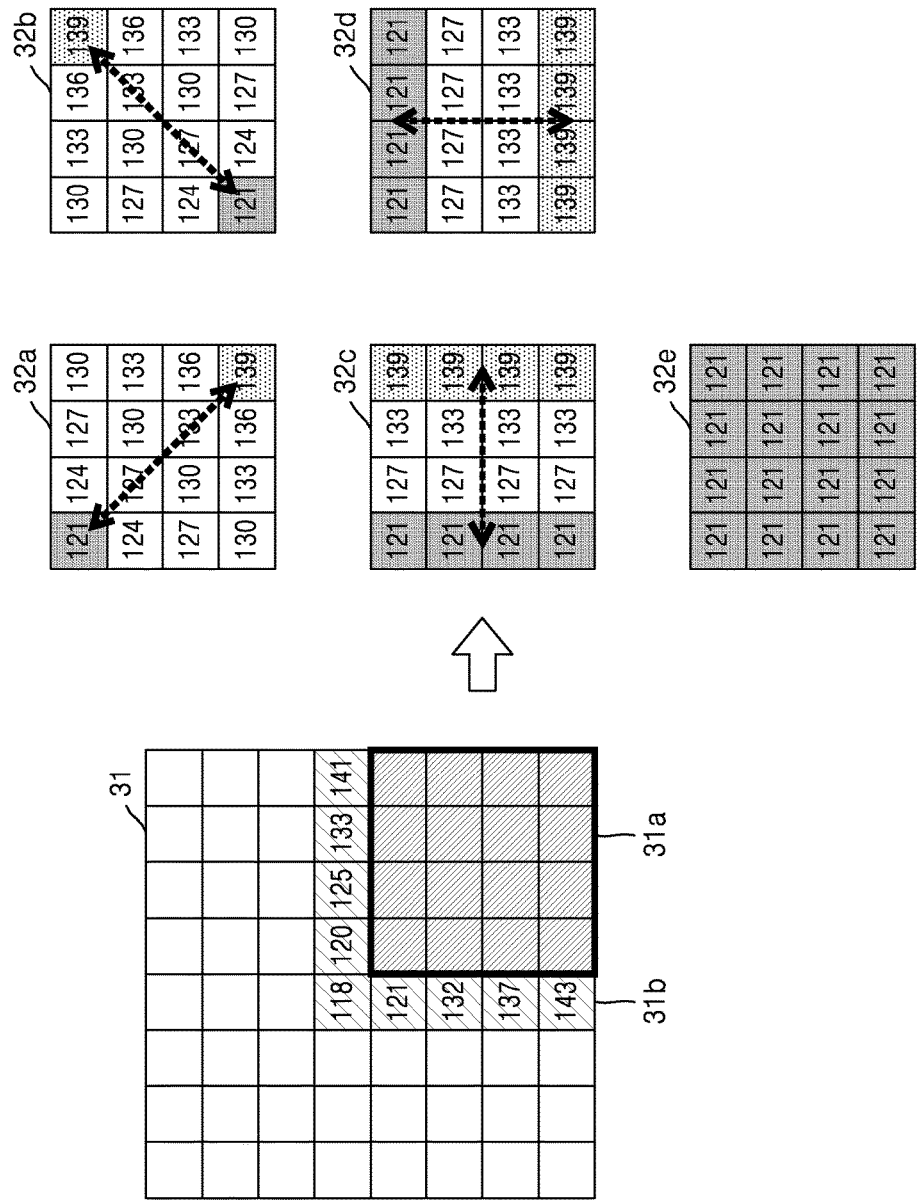
FIG. 3B is a diagram for describing a process of determining one or more sample values related to a first block by using a previously-reconstructed sample adjacent to the first block, according to an embodiment.

FIG. 3B is a diagram for describing a process of determining one or more sample values related to a first block 31a by using a previously-reconstructed sample 31b adjacent to the first block 31a, the process being performed by the image encoding apparatus 10, according to an embodiment.

According to an embodiment, the sample value determiner 11 of the image encoding apparatus 10 may calculate an average value and a standard deviation of the previously-reconstructed sample 31b adjacent to the first block 31a. The sample value determiner 11 of the image encoding apparatus 10 may determine one or more sample values related to the first block 31a by using the calculated average value and standard deviation. For example, the sample value determiner 11 may determine sample values to be the one or more sample values related to the first block 31a, the sample values obtained by subtracting the standard deviation from the average value and adding the standard deviation to the average value. However, a method of determining the one or more sample values by using the average value and the standard deviation may vary, and determined sample values may also be various.

Referring to FIG. 3B, the sample value determiner 11 of the image encoding apparatus 10 may calculate an average value and a standard deviation by referring to the reference sample 31b located in the left, the above, and the upper left of the first block 31a. Sample values of the reference sample 31b may correspond to 118, 120, 121, 125, 132, 133, 137, 141, and 143, respectively, and the sample value determiner 11 may calculate an average value of 130 and a standard deviation of 9, based on the sample values. If it is assumed that sample values of an image each have an integer, the one or more sample values related to the first block 31a may be determined by using the average value of 130 and the standard deviation of 9. For example, the sample value determiner 11 may determine two sample values of 121 and 139 by adding the standard deviation of 9 to the average value of 130 or subtracting the standard deviation of 9 from the average value of 130.

Figure 4A:
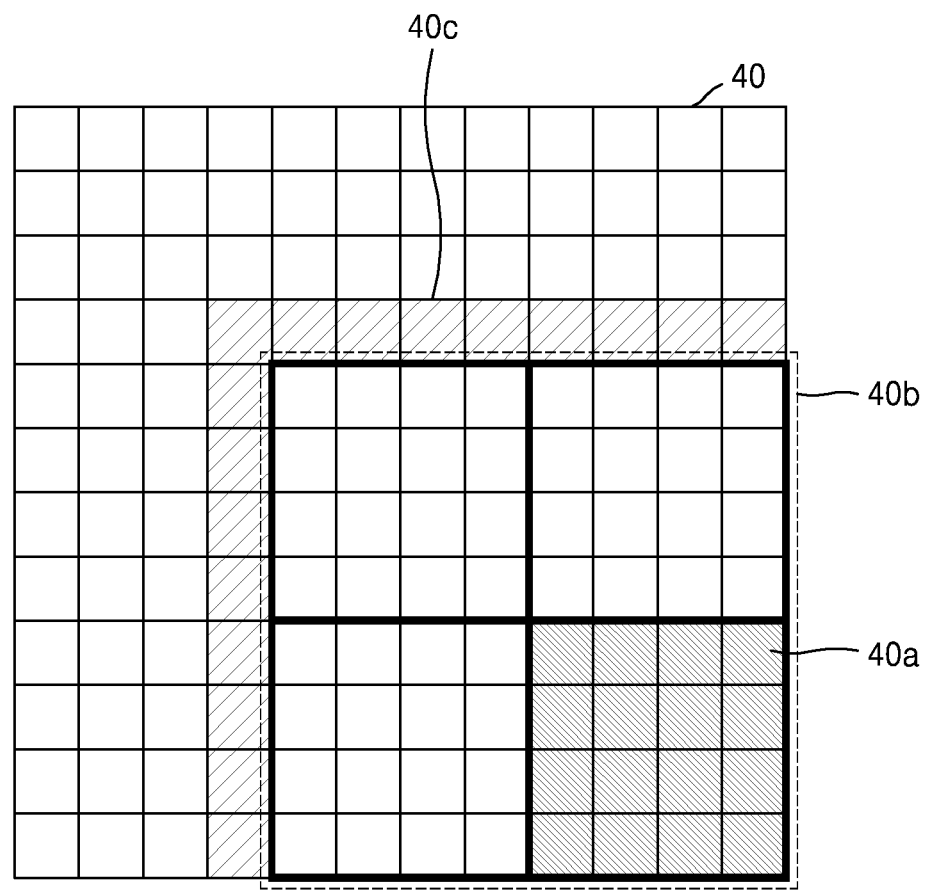
FIG. 4A is a diagram for describing a process of using a previously-reconstructed block adjacent to a first block, according to an embodiment.

FIG. 4A is a diagram for describing a process of using a previously-reconstructed block adjacent to a first block 40a, the process being performed by the image encoding apparatus 10, according to an embodiment.

Referring to FIG. 4A, the sample value determiner 11 of the image encoding apparatus 10 may determine at least one sample value related to the first block 40a by referring to a reference sample 40c that is around the first block 40a and is included in a frame 40. The reference sample 40c that is around the first block 40a which is referable by the sample value determiner 11 may be the previously-reconstructed sample 30b adjacent to the first block 30a as illustrated in FIG. 3A or may be previously-reconstructed samples that are not adjacent to the first block 40a as illustrated in FIG. 4A. For example, the sample value determiner 11 may determine at least one sample value related to the first block 40a by referring to the previously-reconstructed sample 40c that is adjacent to a second block 40b including the first block 40a.

According to an embodiment, the sample value determiner 11 of the image encoding apparatus 10 may use the reference sample 40c that is adjacent to the second block 40b including the first block 40a so as to determine a prediction value of the first block 40a as a prediction unit for predicting an image. The second block 40b including the first block 40a may correspond to a predetermined data unit used in a process of encoding or decoding the image. For example, the second block 40b including the first block 40a may include a coding unit, and the first block 40a may include a prediction unit as one of one or more blocks to split the second block 40b. However, various blocks used in embodiments should not be construed as being limited to the data unit, and may be construed as being various data units that are usable in a process of prediction-encoding the first block 40a. Hereinafter, for convenience of description, it is assumed that the first block 40a is a prediction unit, and the second block 40b is a coding unit including the first block 40a.

According to an embodiment, the second block 40b may be split into blocks having various shapes, and the first block 40a may correspond to one of the split blocks. Referring to FIG. 4A, the image encoding apparatus 10 may determine four prediction units each having a size of 4×4 included in the second block 40b that is the coding unit, and may refer to reference samples adjacent to the second block 40b including the first block 40a so as to determine one or more samples related to the first block 40a that is one of the four prediction units.

Figure 4B:
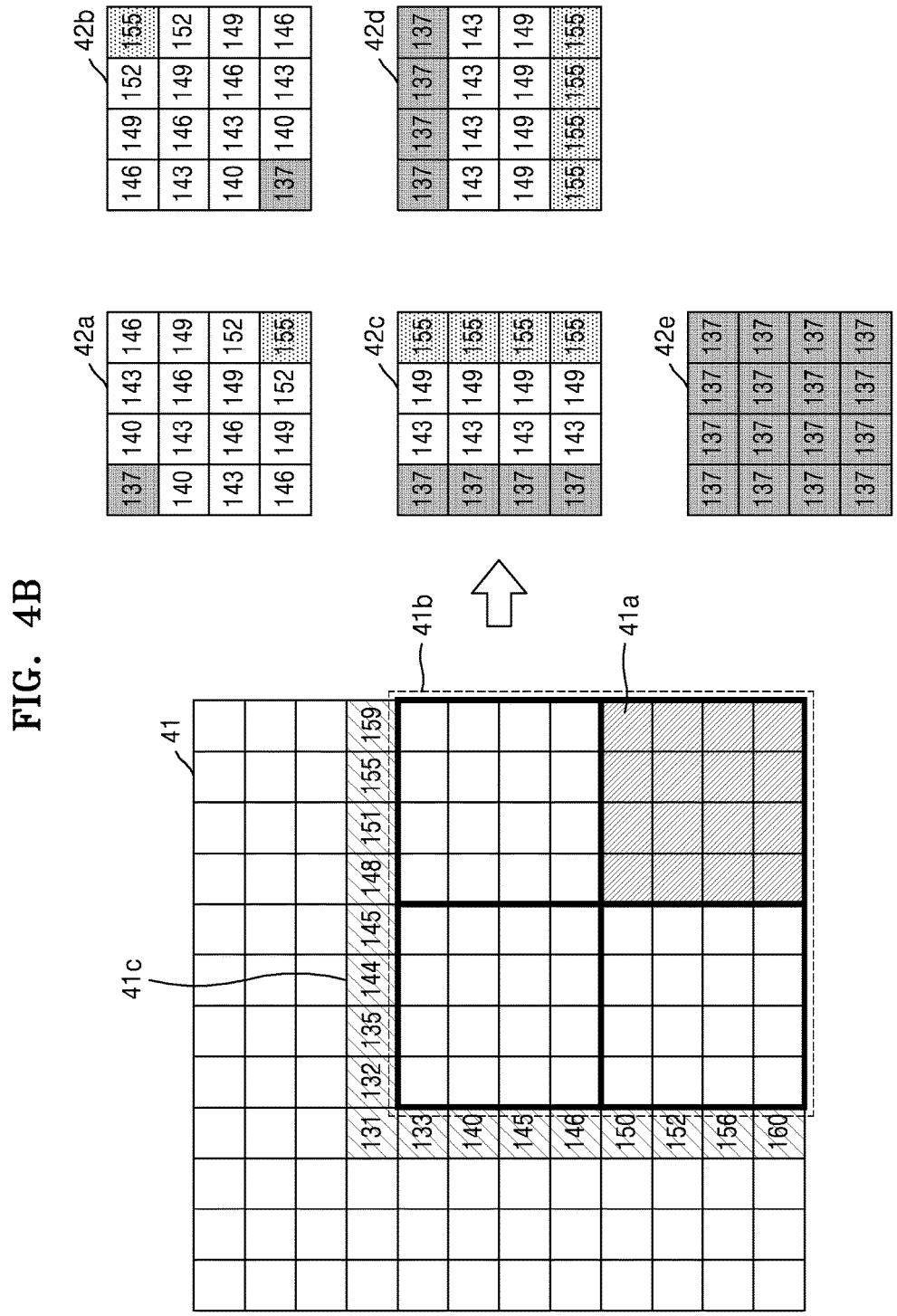
FIG. 4B is a diagram for describing a process of determining one or more samples related to a first block by referring to a previously-reconstructed sample that includes the first block and is adjacent to a second block, according to an embodiment.

FIG. 4B is a diagram for describing a process of determining one or more samples related to a first block 41a by referring to a previously-reconstructed sample 41c that includes the first block 41a and is adjacent to a second block 41b, the process being performed by the image encoding apparatus 10, according to an embodiment. The sample value determiner 11 of the image encoding apparatus 10 may determine one or more sample values related to the first block 41a by using a calculated average value and a calculated standard deviation. For example, the sample value determiner 11 may determine sample values to be the one or more sample values related to the first block 41a, the sample values being obtained by subtracting the standard deviation from the average value and adding the standard deviation to the average value.

According to an embodiment, the sample value determiner 11 of the image encoding apparatus 10 may calculate an average value and a standard deviation of the previously-reconstructed reference sample 41c that includes the first block 41a and is around the second block 41b. Referring to FIG. 4B, the sample value determiner 11 of the image encoding apparatus 10 may calculate the average value and the standard deviation by referring to the reference sample 41c located in the left, the above, and the upper left of the second block 41b. Sample values of the previously-reconstructed reference sample 41c may correspond to 131, 132, 133, 135, 140, 144, 145, 145, 146, 148, 150, 151, 152, 155, 156, 159, and 160, respectively, and the sample value determiner 11 may calculate an average value of 146 and a standard deviation of 9, based on the sample values. If it is assumed that sample values of an image each have an integer, the one or more sample values related to the first block 41a may be determined by using the average value of 146 and the standard deviation of 9. For example, the sample value determiner 11 may determine two sample values of 137 and 155 by adding the standard deviation of 9 to the average value of 146 or subtracting the standard deviation of 9 from the average value of 146.

However, the method of determining one or more sample values related to the first block is merely an embodiment, thus, the method of determining one or more sample values is not limited to the embodiment and thus may be construed as various methods that are obvious to one of ordinary skill in the art.

Figure 4C:
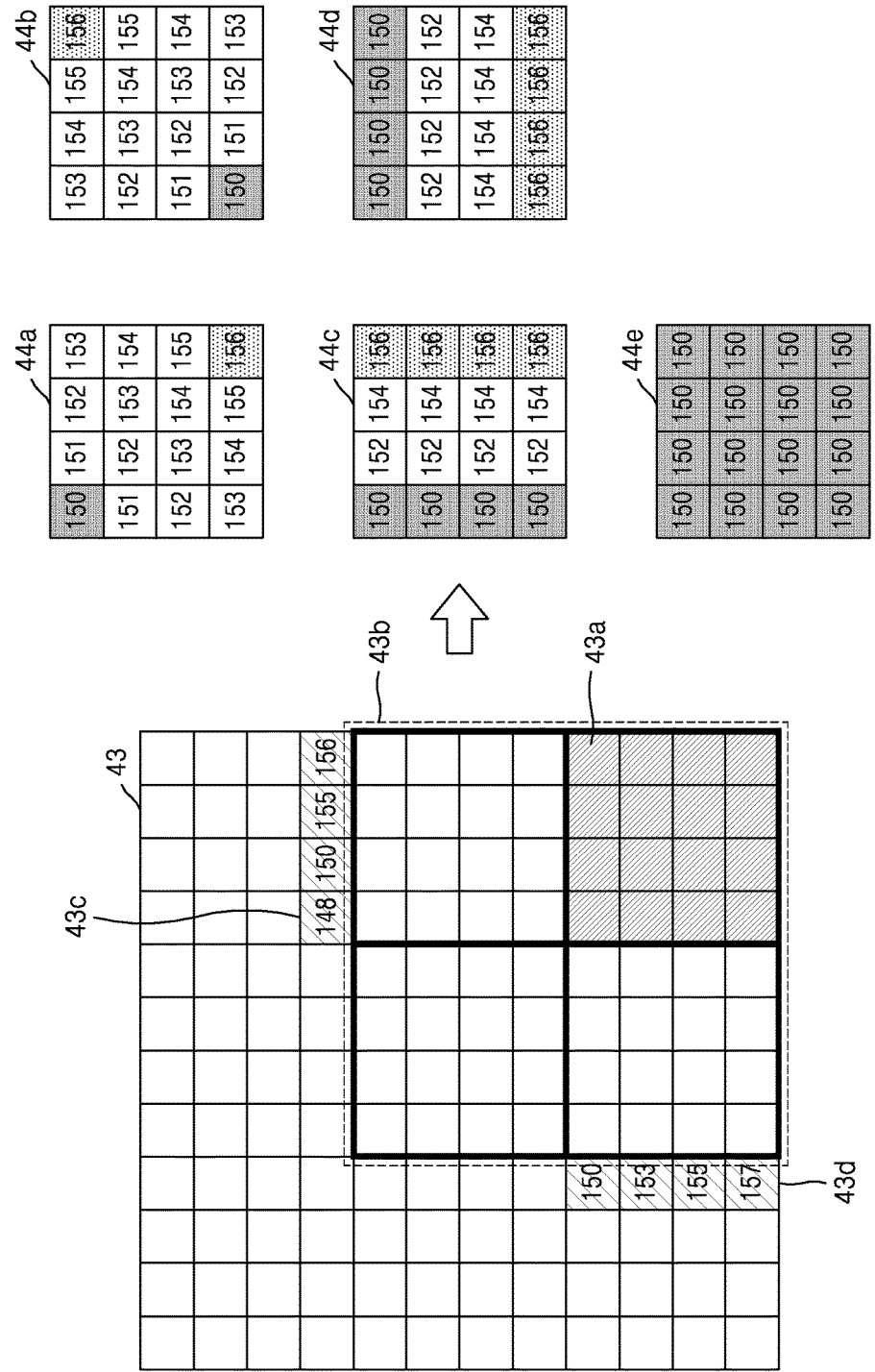
FIG. 4C is a diagram for describing a process of referring to reference samples from among previously-reconstructed samples adjacent to a second block including a first block so as to determine one or more samples related to the first block, according to an embodiment.

FIG. 4C is a diagram for describing a process of referring to reference samples 43*c* and 43*d* from among previously-reconstructed samples adjacent to a second block 43*b* including a first block 43*a* so as to determine one or more samples related to the first block 43*a*, the process being performed by the image encoding apparatus 10, according to an embodiment.

According to an embodiment, the sample value determiner 11 of the image encoding apparatus 10 may determine one or more sample values related to the first block 43*a* by using the reference samples 43*c* and 43*d* around the second block 43*b* including the first block 43*a*, and the reference samples 43*c* and 43*d* of the second block 43*b* which are used by the sample value determiner 11 may correspond to some of previously-reconstructed samples around the second block 43*b*. For example, samples that are from among samples adjacent to the second block 43*b* and are in the left, the above, and the upper left of the second block 43*b* may have been previously reconstructed when the first block 43*a* is predicted. However, the sample value determiner 11 of the image encoding apparatus 10 may determine one or more sample values related to the first block 43*a* by referring to only some of the previously-reconstructed samples, based on a location of the first block 43*a*. For example, the sample value determiner 11 of the image encoding apparatus 10 may refer to some of the previously-reconstructed samples around the second block 43*b*, based on at least one of a row and a column in which samples of the first block 43*a* are located. In more detail, the sample value determiner 11 of the image encoding apparatus 10 may determine one or more sample values related to the first block 43*a* by using at least one of the reference sample 43*c* and the reference sample 43*d* from among the previously-reconstructed samples around the second block 43*b*, wherein the reference sample 43*c* is located in a same column as samples included in the first block 43*a* and the reference sample 43*d* is located in a same row as samples included in the first block 43*a*.

According to an embodiment, the sample value determiner 11 of the image encoding apparatus 10 may calculate an average value and a standard deviation of the previously-reconstructed reference samples 43*c* and 43*d* around the second block 43*b* including the first block 43*a*. The sample value determiner 11 of the image encoding apparatus 10 may determine one or more sample values related to the first block 43*a* by using the calculated average value and the calculated standard deviation. For example, the sample value determiner 11 may determine sample values to be the one or more sample values related to the first block 43*a*, the sample values being obtained by subtracting the standard deviation from the average value and adding the standard deviation to the average value.

Referring to FIG. 4C, the sample value determiner 11 of the image encoding apparatus 10 may calculate an average value and a standard deviation by referring to the reference samples 43*c* and 43*d* located in the left, the above, and the upper left of the second block 43*b*. The reference samples 43*c* and 43*d* may include sample values corresponding to 148, 150, 150, 153, 155, 155, 156, and 157, and the sample value determiner 11 may calculate an average value of 153 and a standard deviation of 3, based on the sample values. If it is assumed that sample values of an image each have an integer, the one or more sample values related to the first block 43*a* may be determined by using the average value of 153 and the standard deviation of 3. For example, the sample value determiner 11 may determine two sample values of 150 and 156 by adding the standard deviation of 3 to the average value of 153 or subtracting the standard deviation of 3 from the average value of 153.

According to an embodiment, the sample value determiner 11 of the image encoding apparatus 10 may determine a plurality of average values by separately selecting some of the reference samples 43*c* and 43*d* around the second block 43*b*, and may use the plurality of average values as the one or more sample values related to the first block 43*a*. Referring to FIG. 4C, the sample value determiner 11 of the image encoding apparatus 10 may determine a sample value of 152 to be an average value of the reference samples 43*c* located in the same column as the samples of the first block 43*a*, the reference samples 43*c* being adjacent to a top of the second block 43*b* from among the reference samples 43*c* and 43*d* around the second block 43*b*, and may determine a sample value of 154 to be an average value of the reference samples 43*d* located in the same row as the samples of the first block 43*a*, the reference samples 43*d* being adjacent to a left end in the second block 43*b*. Through the process, the sample value determiner 11 of the image encoding apparatus 10 may determine values of 152 and 154 to be the one or more sample values related to the first block 43*a*.

Figure 4D:
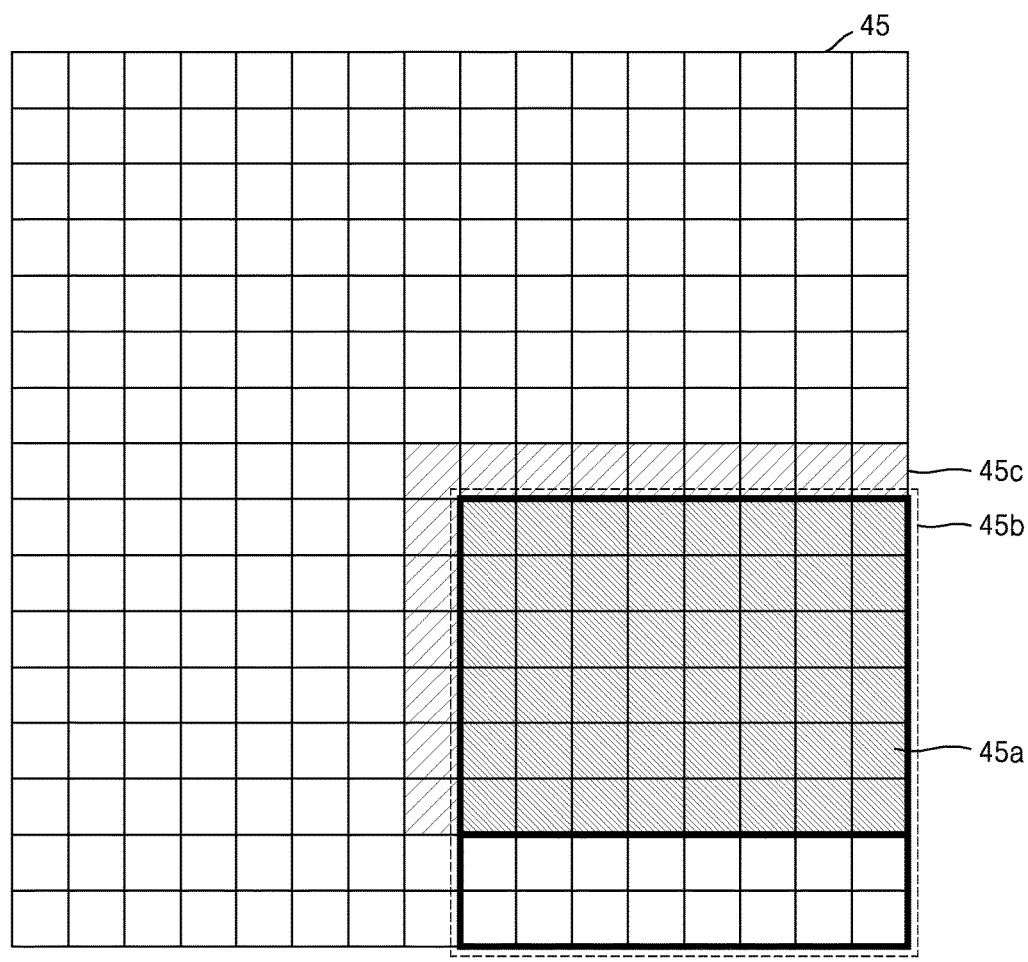
FIG. 4D is a diagram for describing a process of referring to previously-reconstructed samples from among samples adjacent to a first block so as to determine at least one sample value related to the first block included in a second block, according to an embodiment.

FIG. 4D is a diagram for describing a process of referring to previously-reconstructed samples from among samples adjacent to a first block 45*a* so as to determine at least one sample value related to the first block 45*a* included in a second block 45*b*, the process being performed by the image encoding apparatus 10, according to an embodiment.

According to an embodiment, the first block 45*a* may correspond to one of a plurality of blocks included in the second block 45*b*, and a shape thereof may vary. For example, the second block 45*b* may be split into blocks having various shapes including a rectangular shape. The second block 45*b* may be asymmetrically split, and the split blocks may have various forms of polygonal shapes including a quadrangle. Referring to FIG. 4D, the second block 45*b* may be split into two blocks of which heights are each split by 3:1. One of these two blocks may correspond to the first block 45*a*. The sample value determiner 11 of the image encoding apparatus 10 may refer to reference samples 45*c* around the first block 45*a* so as to determine the at least one sample value related to the first block 45*a* having the various forms. For example, reference samples adjacent to at least one of a left end, a top end, and an top-left end in the first block 45*a* may be samples that have been previously reconstructed before the first block 45*a* is encoded, thus, the sample value determiner 11 of the image encoding apparatus 10 may determine the at least one sample value related to the first block 45*a* by referring to the reference samples adjacent to at least one of the left end, the top end, and the top-left end in the first block 45*a*. The process of determining the at least one sample value related to the first block 45*a* may be performed according to various methods including the aforementioned embodiments, thus, detailed descriptions thereof are omitted here.

Figure 4E:
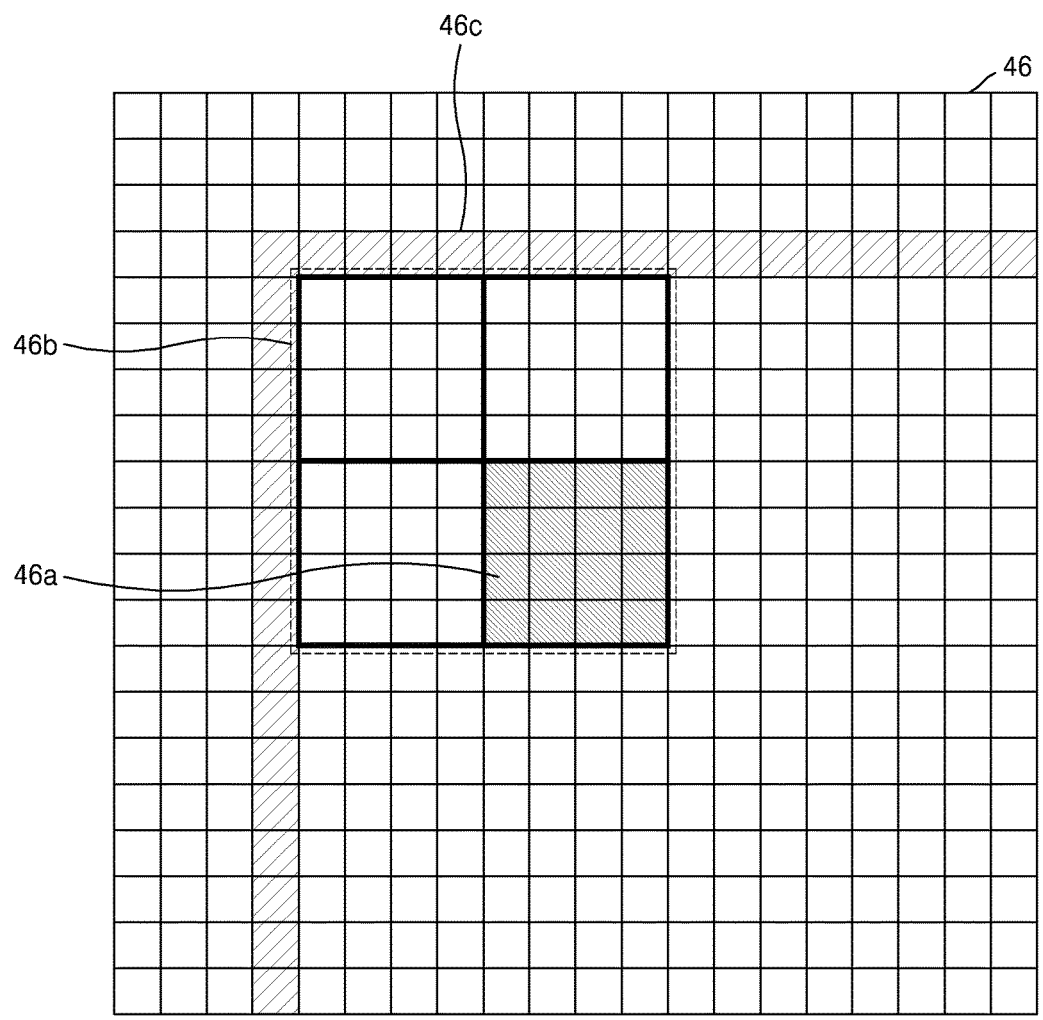
FIG. 4E is a diagram for describing a process of determining at least one sample value related to a first block by using a sample value of a reference sample adjacent to a second block including the first block, according to an embodiment.

FIG. 4E is a diagram for describing a process of determining at least one sample value related to a first block 46*a* by using a sample value of a reference sample 46*c* adjacent to a second block 46b including the first block 46a, the process being performed by the image encoding apparatus 10, according to an embodiment.

According to an embodiment, the sample value determiner 11 of the image encoding apparatus 10 may determine the at least one sample value related to the first block 46a by referring to the reference sample 46c around the first block 46a. The reference sample 46c around the first block 46a which is referable by the sample value determiner 11 may be previously-reconstructed samples that are not adjacent to the first block 46a as illustrated in FIG. 4A. For example, the sample value determiner 11 may determine the at least one sample value related to the first block 46a by referring to the previously-reconstructed sample 46c adjacent to the second block 46b including the first block 46a. According to an embodiment, the reference sample 46c of the second block 46b may include samples located in at least one of a left column and a top row outside the second block 46b. FIG. 4E illustrates an example of the reference sample 46c adjacent to the second block 46b.

Referring to FIG. 4E, according to an embodiment, the sample value determiner 11 of the image encoding apparatus 10 may use the reference sample 46c adjacent to the second block 46b including the first block 46a so as to determine a prediction value of the first block 46a as a prediction unit for predicting an image, and the reference sample 46c that are located in at least one of the left column and the top row may include some of previously-reconstructed samples. The second block 46b including the first block 46a may be a data unit corresponding to a coding unit that is a unit for encoding or decoding an image. Thus, the second block 46b may be split into blocks having various shapes, and the first block 46a may correspond to one of the split blocks. Referring to FIG. 4E, the image encoding apparatus 10 may determine four prediction units each having a size of 4×4 included in the second block 46b that is the coding unit, and may refer to the reference sample 46c adjacent to the second block 46b including the first block 46a so as to determine one or more samples related to the first block 46a that is one of the four prediction units.

However, the method of determining at least one sample value related to the first block by referring to only some of previously-reconstructed samples adjacent to the second block including the first block is merely an embodiment, thus, the method of determining at least one sample value is not limited to the embodiment and thus may be construed as various methods that are obvious to one of ordinary skill in the art.

In operation S202, the image encoding apparatus 10 may determine at least one pattern in which samples of the first block are to be arranged.

According to an embodiment, the pattern determiner 12 of the image encoding apparatus 10 may determine at least one pattern of a form by which samples of the first block 31a are to be arranged, and some of the samples of the first block 31a may include at least one sample determined in operation S200.

According to an embodiment, the pattern with respect to the form by which the samples of the first block 31a are to be arranged may be defined in a manner how each of the samples in the first block 31a is allocated a predicted sample value in a process of encoding the first block 31a. That is, a result of prediction-encoding the first block 31a may differ according to a pattern in which predicted sample values are arranged as the samples of the first block 31a.

Referring to FIG. 3B, the sample value determiner 11 of the image encoding apparatus 10 may determine the one or more sample values related to the first block 31a by referring to the previously-reconstructed reference sample 31b adjacent to the first block 31a. For example, the sample value determiner 11 may determine the one or more sample values of 121 and 139 based on the average value of 130 and the standard deviation of 9 with respect to sample values of the reference sample 31b. In addition, the pattern determiner 12 of the image encoding apparatus 10 may determine at least one pattern in which the samples of the first block 31a are to be arranged. The pattern may be determined to be various forms in which the samples included in the first block 31a may be arranged, and the pattern may become different according to locations in which the determined one or more sample values are to be arranged.

According to an embodiment, the pattern determiner 12 of the image encoding apparatus 10 may determine a pattern 32a in which the one or more sample values are to be arranged at the top left and the bottom right of the first block 31a.

According to an embodiment, the pattern determiner 12 of the image encoding apparatus 10 may determine a pattern 32b in which the one or more sample values are to be arranged at the top right and the bottom left of the first block 31a.

According to an embodiment, the pattern determiner 12 of the image encoding apparatus 10 may determine a pattern 32c in which the one or more sample values determined with respect to the first block 31a are to be arranged in the rightmost column and the leftmost column of the first block 31a.

According to an embodiment, the pattern determiner 12 of the image encoding apparatus 10 may determine a pattern 32d in which the one or more sample values determined with respect to the first block 31a are to be arranged in the uppermost row and the lowermost row of the first block 31a.

According to an embodiment, the pattern determiner 12 of the image encoding apparatus 10 may determine a pattern 32e in which only one sample value of the one or more sample values determined with respect to the first block 31a is to be arranged in the first block 31a.

However, the pattern by which the samples may be arranged in the first block 31a should not be construed as being limited to the aforementioned embodiments and thus may be construed as various patterns that are obvious to one of ordinary skill in the art.

According to an embodiment, the pattern determiner 12 of the image encoding apparatus 10 may arrange samples having a same sample value from among one or more sample values related to a first block in a plurality of locations. That is, the one or more sample values related to the first block may be allocated to a plurality of samples, respectively, in the first block, the one or more sample values being determined by the sample value determiner 11.

Referring to FIG. 4B, according to an embodiment, the sample value determiner 11 of the image encoding apparatus 10 may determine the one or more sample values related to the first block 41a by referring to the previously-reconstructed reference sample 41c adjacent to the second block 41b including the first block 41a. For example, the sample value determiner 11 may determine the one or more sample values of 137 and 155 based on the average value of 146 and the standard deviation of 9 with respect to the sample values of the reference sample 41c. In addition, the pattern determiner 12 of the image encoding apparatus 10 may determine at least one pattern in which the samples of the first block 41a are to be arranged. The pattern may be determined to be various forms in which the samples included in the first block 41a are to be arranged, and the pattern may become different according to locations in which the determined one or more sample values are to be arranged. A characteristic of the pattern of the samples of the first block 41a included in the second block 41b may correspond to a characteristic of the pattern of the samples of the first block 31a described with reference to FIG. 3B, thus, detailed descriptions thereof are omitted here.

According to an embodiment, the pattern determiner 12 of the image encoding apparatus 10 may determine locations in which the one or more sample values related to the first block 41a are to be arranged in the first block 41a, by referring to the reference samples 41c adjacent to the second block 41b, and may determine a pattern of the samples of the first block 41a, based on the determined locations of the one or more sample values. The pattern may be determined to be various forms in which the samples included in the first block 41a may be arranged, and the pattern may become different according to the determined locations in which the one or more sample values are to be arranged.

According to an embodiment, the pattern determiner 12 of the image encoding apparatus 10 may determine various patterns 42a, 42b, 42c, 42d, and 42e in which at least one of the one or more sample values is to be arranged in the first block 41a. Characteristics of the patterns 42a, 42b, 42c, 42d, and 42e of the samples of the first block 41a may correspond to the descriptions provided with reference to FIG. 3B, thus, detailed descriptions thereof are omitted here. The patterns by which the samples may be arranged in the first block 41a should not be construed as being limited to the aforementioned embodiments and thus may be construed as various patterns that are obvious to one of ordinary skill in the art.

According to an embodiment, the sample value determiner 11 of the image encoding apparatus 10 may determine the one or more sample values related to the first block 43a by calculating an average value and a standard deviation of the previously-reconstructed reference samples 43c and 43d adjacent to the second block 43b including the first block 43a. In addition, the sample value determiner 11 of the image encoding apparatus 10 may determine patterns in which the samples of the first block 43a are to be determined, by using the determined one or more sample values. Referring to FIG. 4C, the sample value determiner 11 of the image encoding apparatus 10 may calculate the average value and the standard deviation by referring to the reference samples 43c and 43d located in the left, the above, and the upper left of the second block 43b, and may calculate values corresponding to the average value of 153 and the standard deviation of 3, based on the sample values of the reference samples 43c and 43d. The sample value determiner 11 may determine the two sample values of 150 and 156 by adding the standard deviation of 3 to the average value of 153 or subtracting the standard deviation of 3 from the average value of 153. In addition, the pattern determiner 12 of the image encoding apparatus 10 may determine at least one pattern in which the samples of the first block 43a are to be arranged. The pattern may be determined to be various forms in which the samples included in the first block 43a are to be arranged, and the pattern may become different according to locations in which the determined one or more sample values are to be arranged. A characteristic of the pattern of the samples of the first block 43a included in the second block 43b may correspond to the characteristic of the pattern of the samples of the first block 31a described with reference to FIG. 3B, thus, detailed descriptions thereof are omitted here.

According to an embodiment, based on at least one of a difference between the one or more sample values determined with respect to the first block and locations of the samples having the one or more sample values in the first block, the pattern determiner 12 of the image encoding apparatus 10 may determine sample values and locations of other samples to be included in the first block.

Referring to FIG. 3B, the pattern determiner 12 may determine the pattern 32a in which the one or more sample values determined with respect to the first block 31a are to be arranged at the top left and the bottom right of the first block 31a, and may determine sample values and locations of other samples of the first block 31a, according to a difference between the one or more sample values arranged at the top left and the bottom right. In the case where two samples having one or more sample values of 121 and 139 determined with respect to the first block 31a are arranged respectively at the top left and the bottom right of the first block 31a having a size of 4×4, there is a displacement difference between a top left sample and a bottom right sample, the displacement difference corresponding to three rows and three columns. If it is assumed that a difference between sample values of the samples in the first block 31a is constant, when a sample value is constantly increased or decreased by three samples in a row direction and three samples in a column direction from the top left sample (or the bottom right sample), it is possible to reach the bottom right sample (or the top left sample). Since the difference between the top left sample and the bottom right sample corresponds to 18, a difference between sample values in movement between samples may correspond to 18/(3+3)=3. That is, when locations of samples having one or more sample values related to the first block 31a are determined, sample values of other samples of the first block 31a may be determined according to a difference between the one or more sample values related to the first block 31a and a distance between the samples having the one or more sample values related to the first block 31a. A distance between samples may be defined to be the number of times coordinates of a sample are moved to be increased or decreased in a row direction or column direction when the sample is moved to another sample in a different location.

Referring to FIG. 3B, according to an embodiment, the pattern determiner 12 may determine the pattern 32a or 32b by which the samples having the one or more sample values related to the first block 31a are to be arranged in a diagonal direction in the first block. Sample values of other samples of the first block 31a may include values of 124, 127, 130, 133, and 136 according to a difference between the one or more sample values related to the first block 31a, and a distance between the samples having the one or more sample values related to the first block 31a. The samples of the first block 31a which have the sample values of 124, 127, 130, 133, and 136 may be arranged in a direction to be increased or decreased according to the distance from locations of the samples having the one or more sample values related to the first block 31a.

Referring to FIG. 3B, according to an embodiment, the pattern determiner 12 may determine the pattern 32c or 32d by which the samples having the one or more sample values related to the first block 31a are to be arranged in a horizontal or vertical direction in the first block. In addition, sample values of the other samples of the first block 31a may be determined based on a difference between the one or more sample values related to the first block 31a, and a distance between the samples having the one or more sample values which are determined according to locations of the samples having the one or more sample values related to the first block 31a. Based on the process corresponding to the aforementioned embodiment, the pattern determiner 12 may determine values of 127 and 133 to be the sample values of the other samples of the first block 31a. The samples of the first block 31a which have the sample values of 127 and 133 may be arranged in a direction to be increased or decreased according to the distance from the locations of the samples having the one or more sample values related to the first block 31a.

Referring to FIG. 3B, according to an embodiment, the pattern determiner 12 may determine all samples in the first block 31a to have one of the one or more sample values related to the first block 31a which are determined by the sample value determiner 11. According to another embodiment, the pattern determiner 12 may determine one sample value based on the one or more sample values related to the first block 31a. For example, the pattern determiner 12 may determine all samples in the first block 31a to have a sample value corresponding to an average value of the one or more sample values related to the first block 31a which are determined by the sample value determiner 11.

Referring to FIG. 4B, according to an embodiment, the sample value determiner 11 may determine the one or more samples related to the first block 41a by referring to the previously-reconstructed sample 41c that includes the first block 41a and is adjacent to the second block 41b. In addition, the pattern determiner 12 may determine the pattern 42a or 42b by which the samples having the one or more sample values related to the first block 41a are to be arranged in a diagonal direction in the first block, and sample values of other samples of the first block 41a may include values of 140, 143, 146, 149, and 152 according to a difference between the one or more sample values related to the first block 41a, and a distance between the samples having the one or more sample values related to the first block 41a. The samples of the first block 41a which have the sample values of 140, 143, 146, 149, and 152 may be arranged in a direction to be increased or decreased according to the distance from locations of the samples having the one or more sample values related to the first block 41a.

Referring to FIG. 4B, according to an embodiment, the sample value determiner 11 may determine the one or more samples related to the first block 41a by referring to the previously-reconstructed sample 41c that includes the first block 41a and is adjacent to the second block 41b. In addition, the pattern determiner 12 may determine the pattern 42c or 42d by which the samples having the one or more sample values related to the first block 41a are to be arranged in a horizontal or vertical direction in the first block. In addition, sample values of the other samples of the first block 41a may be determined based on a difference between the one or more sample values related to the first block 41a, and a distance between the samples having the one or more sample values which are determined according to locations of the samples having the one or more sample values related to the first block 41a. Based on the process corresponding to the aforementioned embodiment, the pattern determiner 12 may determine values of 143 and 149 to be the sample values of the other samples of the first block 41a. The samples of the first block 41a which have the sample values of 143 and 149 may be arranged in a direction to be increased or decreased according to the distance from the locations of the samples having the one or more sample values related to the first block 41a.

Referring to FIG. 4B, according to an embodiment, the sample value determiner 11 may determine the one or more samples related to the first block 41a by referring to the previously-reconstructed sample 41c that includes the first block 41a and is adjacent to the second block 41b. In addition, the pattern determiner 12 may determine all samples in the first block 41a to have one of the one or more sample values related to the first block 41a which are determined by the sample value determiner 11. According to another embodiment, the pattern determiner 12 may determine one sample value based on the one or more sample values related to the first block 41a. For example, the pattern determiner 12 may determine all samples in the first block 41a to have a sample value corresponding to an average value of the one or more sample values related to the first block 41a which are determined by the sample value determiner 11.

Referring to FIG. 4C, according to an embodiment, the sample value determiner 11 may determine the one or more samples related to the first block 43a by referring to the reference samples 43c and 43d from among the previously-reconstructed samples adjacent to the second block 43b, based on at least one of a column and a row in which the samples of the first block 43a are located. In addition, the pattern determiner 12 may determine the pattern 44a or 44b by which the samples having the one or more sample values related to the first block 43a are to be arranged in a diagonal direction in the first block, and sample values of other samples of the first block 43a may include values of 151, 152, 153, 154, and 155 according to a difference between the one or more sample values related to the first block 43a, and a distance between the samples having the one or more sample values related to the first block 43a. The samples of the first block 43a which have the sample values of 151, 152, 153, 154, and 155 may be arranged in a direction to be increased or decreased according to the distance from locations of the samples having the one or more sample values related to the first block 43a.

Referring to FIG. 4C, according to an embodiment, the sample value determiner 11 may determine the one or more samples related to the first block 43a by referring to the reference samples 43c and 43d from among the previously-reconstructed samples adjacent to the second block 43b, based on at least one of the column and the row in which the samples of the first block 43a are located. In addition, the pattern determiner 12 may determine the pattern 44c or 44d by which the samples having the one or more sample values related to the first block 43a are to be arranged in a horizontal or vertical direction in the first block. In addition, sample values of other samples of the first block 43a may be determined based on a difference between the one or more sample values related to the first block 43a, and a distance between the samples having the one or more sample values which are determined with respect to the locations of the samples having the one or more sample values related to the first block 43a. Based on the process corresponding to the aforementioned embodiment, the pattern determiner 12 may determine values of 152 and 154 to be the sample values of the other samples of the first block 43a. The samples of the first block 43a which have the sample values of 152 and 154 may be arranged in a direction to be increased or decreased according to the distance from the locations of the samples having the one or more sample values related to the first block 43a.

Referring to FIG. 4C, according to an embodiment, the sample value determiner 11 may determine the one or more samples related to the first block 43a by referring to the reference samples 43c and 43d from among the previously-reconstructed samples adjacent to the second block 43b, based on at least one of the column and the row in which the samples of the first block 43*a* are located. In addition, the pattern determiner 12 may determine all samples in the first block 43*a* to have one of the one or more sample values related to the first block 43*a* which are determined by the sample value determiner 11. According to another embodiment, the pattern determiner 12 may determine one sample value based on the one or more sample values related to the first block 43*a*. For example, the pattern determiner 12 may determine all samples in the first block 43*a* to have a sample value corresponding to an average value of the one or more sample values related to the first block 43*a* which are determined by the sample value determiner 11.

In operation S204, according to an embodiment, the candidate prediction block generator 13 of the image encoding apparatus 10 may generate one or more candidate prediction blocks for the first block, based on the at least one sample value determined in operation S200 and the at least one pattern determined in operation S202.

According to an embodiment, the candidate prediction block generator 13 of the image encoding apparatus 10 may generate a candidate prediction block for each first block, based on at least one sample value and at least one pattern related to each block included in a frame forming an image. When a reference sample is determined based on a location of the second block including the first block (e.g., FIG. 4A, FIG. 4E, etc.), candidate prediction block groups with respect to one or more first blocks included in the second block may be equal to each other. However, when the reference sample is determined based on only the location of the first block (e.g., FIG. 3A, FIG. 3B, etc.) or when the reference sample is determined based on the locations of the first block and the second block (e.g., FIG. 4C, FIG. 4E, etc.), a sample value of the reference sample which is referred to by the first block may become difference according to the location of the first block, thus, candidate prediction block groups with respect to one or more first blocks included in the second block may be different from each other. Types of a candidate prediction block which may be generated may include candidate prediction blocks of the first block which are generated according to the aforementioned embodiments, however, the types of the candidate prediction block should not be construed as being limited to the embodiments and may be changed within the scope that is obvious to one of ordinary skill in the art.

In operation S206, according to an embodiment, the prediction value determiner 14 of the image encoding apparatus 10 may determine prediction values of the samples of the first block, based on one of the one or more candidate prediction blocks generated in operation S204.

According to an embodiment, the prediction value determiner 14 of the image encoding apparatus 10 may predict the samples of the first block by using one of the one or more candidate prediction blocks of the first block which are generated by the candidate prediction block generator 13. That is, the image encoding apparatus 10 may perform prediction on the first block by predicting the sample values of the first block to be similar to sample values of reference samples by referring to the reference samples that are previously reconstructed and are located adjacent to the first block or the second block including the first block.

According to an embodiment, in order to determine the prediction values of the samples of the first block, the image encoding apparatus 10 may determine the prediction values of the samples of the first block by selecting and using one of the one or more candidate prediction blocks, which are generated by the candidate prediction block generator 13, based on rate-distortion costs. That is, the image encoding apparatus 10 may determine the prediction values of the samples of the first block based on a candidate prediction block having an optimal rate-distortion cost, the candidate prediction block being from among the one or more candidate prediction blocks which are generated by the candidate prediction block generator 13.

Figure 4F:
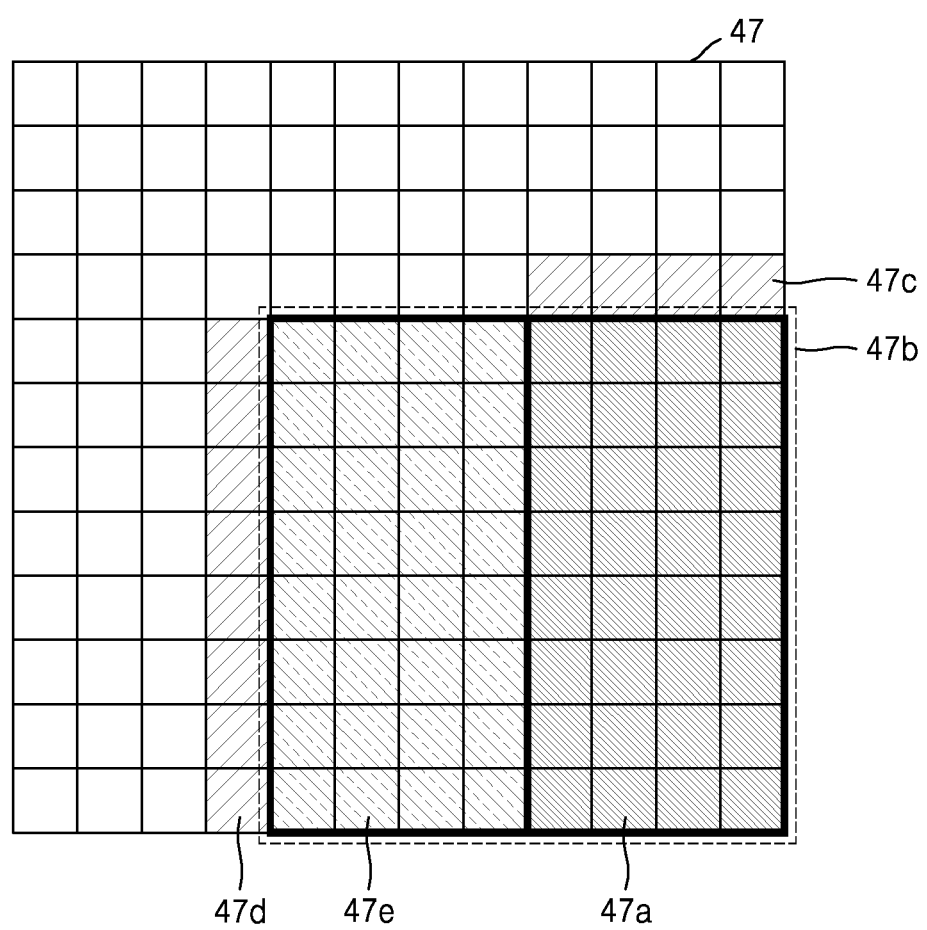
FIG. 4F is a diagram for describing a method of determining, based on one of one or more candidate prediction blocks, prediction values of samples of a first block from among one or more blocks included in a second block, according to an embodiment.

FIG. 4F is a diagram for describing a method of determining, based on one of one or more candidate prediction blocks, prediction values of samples of a first block from among one or more blocks included in a second block 47*b*, the method being performed by the image encoding apparatus 10, according to an embodiment.

According to an embodiment, the image encoding apparatus 10 may determine, based on one of one or more candidate prediction blocks, prediction values of samples of only a first block 47*a* that is at least one block from among a plurality of blocks included in the second block 47*b*. The image encoding apparatus 10 may use some methods of various image encoding methods of determining a prediction value of a first block when an image is encoded. The image encoding apparatus 10 may determine prediction values of samples of some of the plurality of blocks included in the second block 47*b* by using the image encoding method according to various embodiments, and may determine prediction values of samples of other blocks by using another image encoding method.

Referring to FIG. 4F, according to an embodiment, the second block 47*b* may include two blocks that vertically split the second block 47*b*. With respect to the first block 47*a* that is one of the two blocks, the prediction values of the samples of the first block 47*a* may be determined by using the image encoding method according to the various embodiments described above with reference to FIG. 2A. For example, the image encoding apparatus 10 may determine the first block 47*a* and one or more sample values by referring to reference samples located around the second block 47*b*, and may determine at least one pattern in which samples of the first block 47*a* are to be arranged. The image encoding apparatus 10 may generate the one or more candidate prediction blocks for the first block 47*a*, based on the determined one or more sample values and the determined at least one pattern, and may determine the prediction values of the samples of the first block 47*a* based on one of the generated one or more candidate prediction blocks. In addition, for the other block 47*e* included in the second block 47*b*, the image encoding apparatus 10 may determine prediction values of samples included in the other block 47*e* by using an image encoding method different from that for the first block 47*a*. The different image encoding method of determining the prediction values of the samples of the other block 47*e* may include various encoding methods different from the aforementioned embodiments of the present disclosure. As a representative example, an image processing method based on H. 264 or High Efficiency Video Coding (HEVC) may be used, and an image encoding method or image decoding method based on HEVC will be described below. However, the image encoding method used for the other block 47*e* should not be construed as being limited to H. 264 or HEVC.

According to an embodiment, the image encoding apparatus 10 may include a bitstream generator (not shown) to generate a bitstream including first information indicating whether to determine the prediction values of the samples of the first block by using one or more candidate prediction blocks, based on at least one of a block, a slice segment, a slice, and a picture. According to an embodiment, the image encoding apparatus 10 may generate the bitstream including the first information indicating whether to determine the prediction values of the samples of the first block, based on a data unit corresponding to at least one of a block, a slice segment that may include the block, a slice that may include the slice segment, a frame that may include the slice, and a sequence that may include the frame. An image decoding apparatus 15 may obtain the bitstream including the first information, and may determine whether the first block encoded by using one of various embodiments is included in the corresponding data unit.

According to an embodiment, the image encoding apparatus 10 may generate the bitstream including the first information indicating whether to determine the prediction values of the samples of the first block by using the one or more candidate prediction blocks, based on at least one of a block, a slice segment, a slice, and a picture, and the first information may be information included in a syntax, a slice segment header, a slice header, a picture parameter set, or a sequence parameter set with respect to a block unit (e.g., a coding unit or a prediction unit as a data processing unit for encoding).

According to an embodiment, the first information indicating whether to determine the prediction values of the samples of the first block may include information indicating which candidate prediction block was used in determining the prediction values of the samples of the first block. That is, the image encoding apparatus 10 may generate a bitstream including distinguishment information for distinguishing between one or more patterns by which the samples of the first block are to be arranged, or information about an index.

According to an embodiment, the pattern determiner 12 of the image encoding apparatus 10 may determine one of the one or more patterns by which the samples of the first block are to be arranged, based on the distinguishment information or the information about an index about a pattern used in determining prediction values of samples of blocks that are adjacent to the first block and are previously reconstructed, and may determine the prediction values of the samples of the first block based on the determined pattern. The samples that are adjacent to the first block and are used in determining the prediction values are likely to have the similar sample values to those of the samples of the first block, and a pattern by which the samples are to be arranged is likely to be similar, thus, an efficient encoding process may be performed in a manner that a process of predicting the samples of the first block is performed corresponding to a process of predicting the sample values of the blocks adjacent to the first block.

Figure 5:
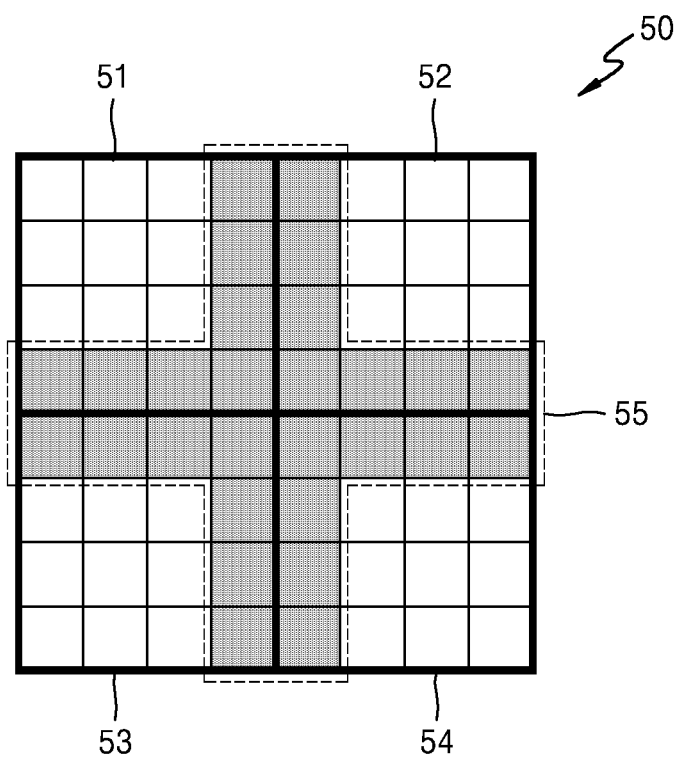
FIG. 5 illustrates a flat filtering process between a plurality of first blocks including predicted sample values, according to an embodiment.

FIG. 5 illustrates a flat filtering process between a plurality of first blocks including predicted sample values, the flat filtering process being performed by the image encoding apparatus 10, according to an embodiment.

In more detail, FIG. 5 illustrates an example in which prediction values of samples of a first block are determined and then flat filtering is performed on a boundary between the first blocks.

A second block 50 includes four first blocks 51, 52, 53, and 54. In this regard, the first blocks 51, 52, 53, and 54 may each correspond to a prediction unit as a data processing unit to be used in a prediction process while an image is encoded, and the second block 50 may correspond to a coding unit that may include at least one prediction unit. Since the first blocks 51, 52, 53, and 54 are predicted by different prediction modes, continuity of samples located on boundaries between the first blocks 51, 52, 53, and 54 may be small.

Thus, by performing flat filtering on the samples located on the boundaries between the first blocks 51, 52, 53, and 54, continuity of the samples may be increased.

The flat filtering may be performed by using various methods according to three conditions. As the first condition, the flat filtering may be differently performed according to how far the flat filtering is to be applied to samples distant from the boundaries between the first blocks 51, 52, 53, and 54. For example, the flat filtering may be performed only on samples close to the boundaries between the first blocks 51, 52, 53, and 54. As another example, the flat filtering may be performed on samples that are distant by two samples from the boundaries between the first blocks 51, 52, 53, and 54. As another example, a range of samples by which the flat filtering is to be performed by be determined according to a size of the first blocks 51, 52, 53, and 54.

As the second condition, the flat filtering may be differently applied according to the number of taps of a filter to be used. For example, when a three-tap filter is used, a sample on which the flat filtering is to be performed is filtered according to a sample located at the left of the sample and a sample located at the right of the sample. As another example, when a five-tap filter is used, a sample on which the flat filtering is to be performed is filtered according to two samples located at the left of the sample and two samples located at the right of the sample.

As the third condition, the flat filtering may be differently applied according to filter coefficients of a filter to be used. In the case of the three-tap filter, filter coefficients may be determined to be [a1, a2, a3]. When a2 is increased compared to a1 and a3, strength of filtering may be decreased. In the case of the five-tap filter, filter coefficients may be determined to be [a1, a2, a3, a4, a5]. When a3 is increased compared to a1, a2, a4, and a5, strength of filtering may be decreased. For example, filtering strength of the five-tap filter of which filter coefficients are [1 4 6 4 1] is higher than filtering strength of the five-tap filter of which filter coefficients are [1 2 10 2 1].

According to the embodiment illustrated in FIG. 5, the flat filtering may be performed on samples 55 adjacent to the boundaries between the first blocks 51, 52, 53, and 54. Since the flat filtering is performed on the samples 55 adjacent to the boundaries, continuity of samples included in the second block 50 may be increased.

Figure 6:
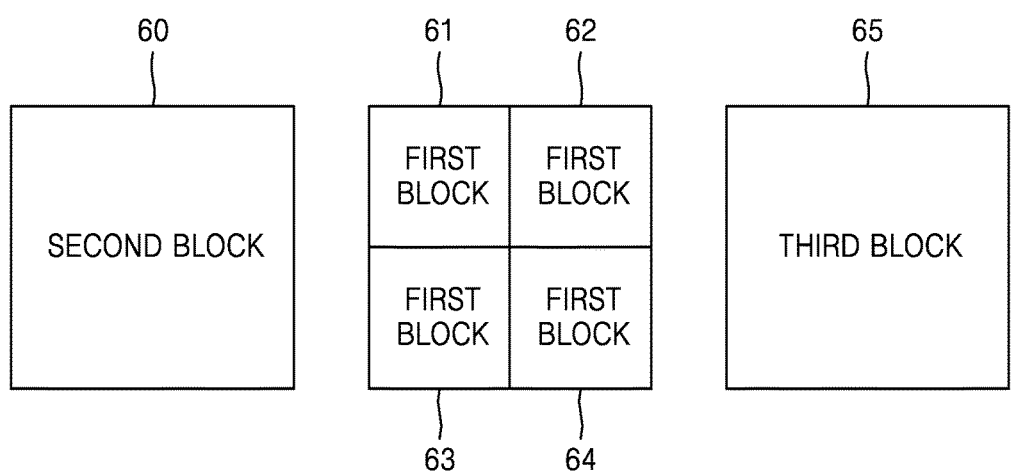
FIG. 6 is a diagram for describing a method of transforming a second block including prediction values of samples of a plurality of first blocks.

FIG. 6 is a diagram for describing a method of transforming a second block 60 including prediction values of samples of a plurality of first blocks 61, 62, 63, and 64.

In this regard, the first blocks 61, 62, 63, and 64 may each correspond to a prediction unit as a data processing unit to be used in a prediction process while an image is encoded, and the second block 60 may correspond to a coding unit that may include at least one prediction unit. In addition, a transformation unit that is a data unit for transforming samples included in the second block 60 may be defined to be a third block 65. Hereinafter, for convenience of description, it is assumed that the first blocks 61, 62, 63, and 64 are prediction units, the second block 60 is a coding unit, and the third block 65 is a transformation unit.

According to an embodiment, in FIG. 6, sizes of the coding unit 60 and the transformation unit 65 are equal to 2N×2N, and a size of each of the prediction units 61, 62, 63, and 64 is N×N.

According to the related art, in an intra prediction process in which prediction is performed by referring to reconstructed samples adjacent to a prediction unit, intra prediction may not be performed on all of the prediction units 61, 62, 63, and 64 in the transformation unit 65. Since the intra prediction and transformation are performed on all samples, based on the transformation unit 65, even if samples included in the prediction unit 61 include prediction values, prediction values of samples included in other prediction units 62, 63, and 64 are not yet determined so that transformation on the samples that already include the prediction values and are included in the prediction unit 61 may not be possible.

However, according to various embodiments including FIGS. 4A, 4B, and 4C, the prediction units 61, 62, 63, and 64 may be predicted based on reference samples adjacent to the coding unit 60 so that all samples included in the transformation unit 65 may be predicted in parallel. That is, the prediction units 61, 62, 63, and 64 may be included in the coding unit 60, and according to an embodiment, the image encoding apparatus 10 may determine prediction values of samples of the prediction units 61, 62, 63, and 64 included in the coding unit 60 by using previously-reconstructed reference samples adjacent to the coding unit 60. Thus, according to an embodiment, even when the transformation unit 65 is larger than each of the prediction units 61, 62, 63, and 64, the image encoding apparatus 10 may perform transformation by determining a prediction value of a sample included in each of prediction units by referring to the previously-reconstructed reference samples adjacent to the coding unit 60. According to an embodiment, prediction on prediction units and generation of a residual signal with respect to transformation units may be independently performed in parallel. Also, there is a high probability that continuity of reference samples, which are distance from a prediction unit, and samples included in the prediction unit is maintained in a high-resolution image, efficient image encoding may be possible in the high-resolution image.

The aforementioned embodiments are various embodiments of the image encoding apparatus 10 capable of performing an image encoding method of encoding an image. The image decoding apparatus 15 that receives an image encoded according to the image encoding method may decode the image by using an image decoding method corresponding to the image encoding method. Hereinafter, characteristics of the image decoding apparatus 15 that performs the image decoding method will now be described through various embodiments.

Figure 1B:
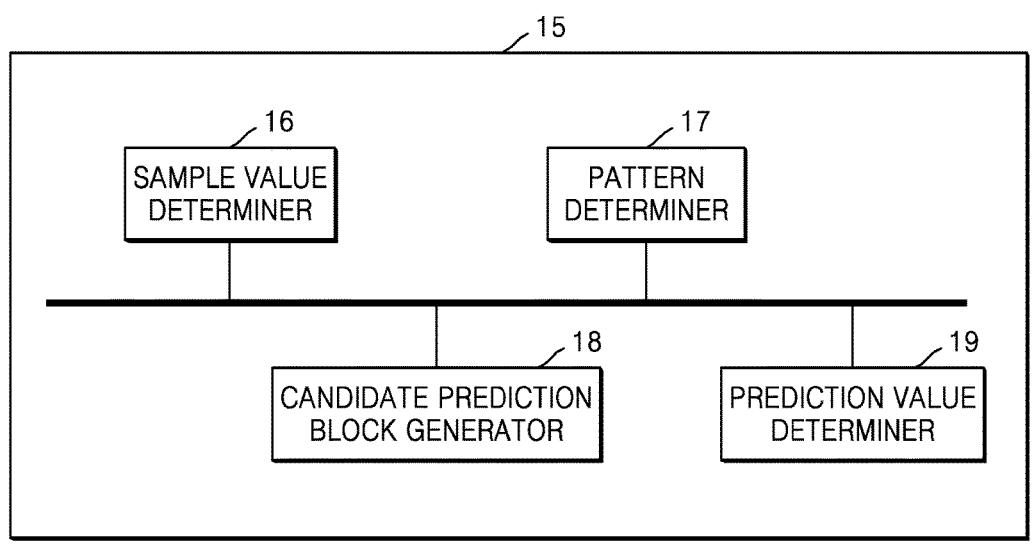
FIG. 1B illustrates a block diagram of an image decoding apparatus capable of performing a method of decoding an image, according to an embodiment.

FIG. 1B illustrates a block diagram of the image decoding apparatus 15 capable of performing a method of decoding an image, according to an embodiment.

According to an embodiment, the image decoding apparatus 15 may include a sample value determiner 16, a pattern determiner 17, a candidate prediction block generator 18, and a prediction value determiner 19. With reference to detailed embodiments below, an operation of each element of the image decoding apparatus 15 will now be described.

Figure 2B:
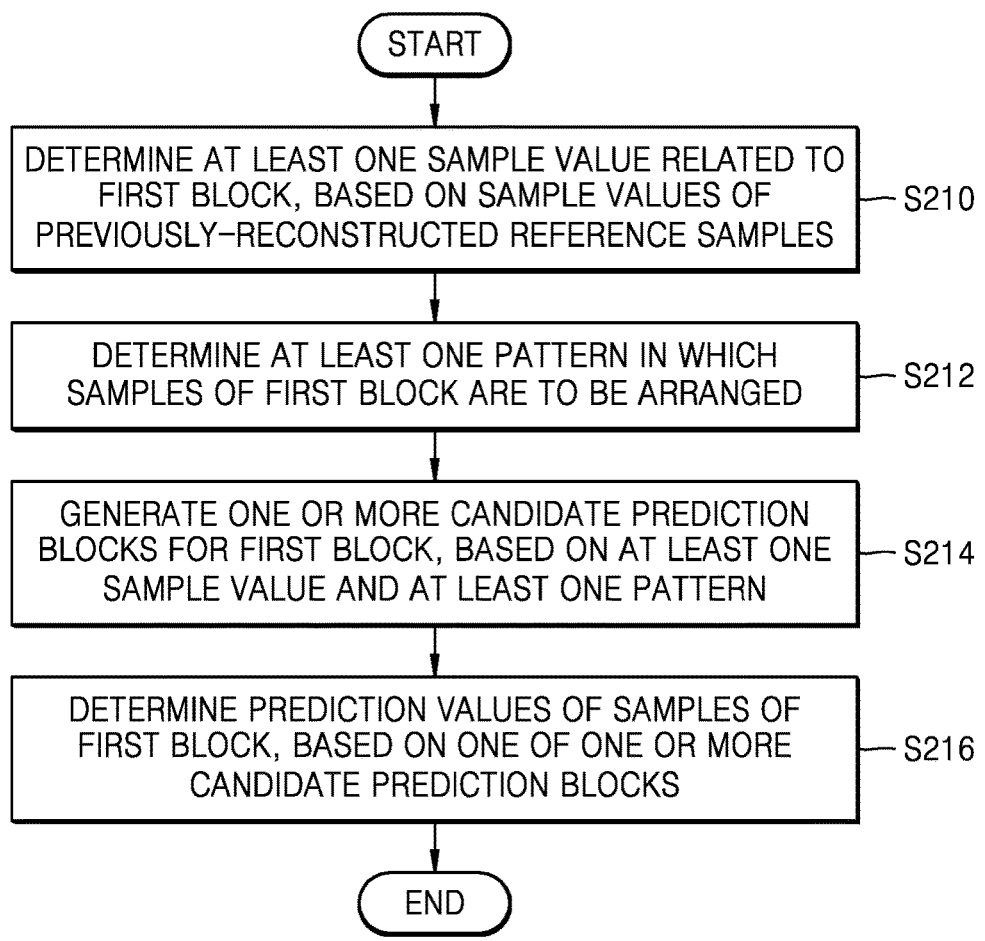
FIG. 2B shows a flowchart of a process of determining prediction values of samples of a first block by using a previously-reconstructed sample so as to decode an image, the process being performed by the image decoding apparatus, according to an embodiment.

FIG. 2B shows a flowchart of a process of determining prediction values of samples of a first block by using a previously-reconstructed sample so as to decode an image, the process being performed by the image decoding apparatus 15, according to an embodiment.

In operation S210, the sample value determiner 15 of the image decoding apparatus 15 may determine at least one sample value related to the first block, based on sample values of previously-reconstructed reference samples.

According to an embodiment, the sample value determiner 16 may use the sample values of the previously-reconstructed samples so as to predict samples of the first block that is not yet reconstructed. The sample value determiner 16 may determine the at least one sample value related to the first block by referring to previously-reconstructed samples adjacent to the first block. The at least one sample value related to the first block may be a representative value for indicating the first block. For example, the sample value determiner 16 may determine the at least one sample value for indicating the first block by calculating an average value and a standard deviation of the previously-reconstructed samples adjacent to the first block. Samples adjacent to the first block, which are referred to by the sample value determiner 16 to determine one or more samples related to the first block, may be defined as a reference sample of the first block. According to an embodiment, the sample value determiner 16 of the image decoding apparatus 15 may determine a location of a sample having the at least one sample value in the first block, and may determine sample values of other samples of the first block, based on the location of the sample having the at least one sample value.

FIG. 3A is a diagram for describing a process of using a previously-reconstructed block adjacent to the first block 30a, according to an embodiment.

According to an embodiment, the sample value determiner 16 of the image decoding apparatus 15 may refer to the previously-reconstructed sample 30b that is adjacent to the first block 30a and is included in the frame 30. Because the previously-reconstructed sample 30b to be referred to by the sample value determiner 16 is already reconstructed, the previously-reconstructed sample 30b may include information about each sample value. According to an image decoding method, a location of reconstructed samples with respect to the first block 30a may be limited. A characteristic of an operation by the sample value determiner 16 of the image decoding apparatus 15 may correspond to an operation by the sample value determiner 11 of the image encoding apparatus 10 described above with reference to FIG. 3A, thus, detailed descriptions thereof are omitted.

FIG. 3B is a diagram for describing a process of determining one or more sample values related to the first block 31a by using the previously-reconstructed sample 31b adjacent to the first block 31a, the process being performed by the image decoding apparatus 15, according to an embodiment.

According to an embodiment, the sample value determiner 16 of the image decoding apparatus 15 may calculate an average value and a standard deviation of the previously-reconstructed sample 31b adjacent to the first block 31a. A characteristic of an operation by the sample value determiner 16 of the image decoding apparatus 15 may correspond to an operation by the sample value determiner 11 of the image encoding apparatus 10 described above with reference to FIG. 3B, thus, detailed descriptions thereof are omitted.

FIG. 4A is a diagram for describing a process of using a previously-reconstructed block adjacent to the first block 40a, the process being performed by the image decoding apparatus 15, according to an embodiment.

Referring to FIG. 4A, the sample value determiner 16 of the image decoding apparatus 15 may determine at least one sample value related to the first block 40a by referring to the reference sample 40c that is around the first block 40a and is included in the frame 40. The reference sample 40c that is around the first block 40a which is referable by the sample value determiner 16 may be the previously-reconstructed sample 30b adjacent to the first block 30a as illustrated in FIG. 3A or may be previously-reconstructed samples that are not adjacent to the first block 40a as illustrated in FIG. 4A. For example, the sample value determiner 16 may determine at least one sample value related to the first block 40a by referring to the previously-reconstructed sample 40c that is adjacent to a second block 40b including the first block 40a. A characteristic of an operation by the sample value determiner 16 of the image decoding apparatus 15 may correspond to an operation by the sample value determiner 11 of the image encoding apparatus 10 described above with reference to FIG. 4A, thus, detailed descriptions thereof are omitted. FIG. 4B is a diagram for describing a process of determining one or more samples related to the first block 41a by referring to the previously-reconstructed sample 41c that includes the first block 41a and is adjacent to the second block 41b, the process being performed by the image decoding apparatus 15, according to an embodiment.

According to an embodiment, the sample value determiner 16 of the image decoding apparatus 15 may calculate an average value and a standard deviation of the previously-reconstructed reference sample 41c that includes the first block 41a and is around the second block 41b. A characteristic of an operation by the sample value determiner 16 of the image decoding apparatus 15 may correspond to an operation by the sample value determiner 11 of the image encoding apparatus 10 described above with reference to FIG. 4B, thus, detailed descriptions thereof are omitted.

FIG. 4C is a diagram for describing a process of referring to the reference samples 43c and 43d from among previously-reconstructed samples adjacent to the second block 43b including the first block 43a so as to determine one or more samples related to the first block 43a, the process being performed by the image decoding apparatus 15, according to an embodiment.

According to an embodiment, the sample value determiner 16 of the image decoding apparatus 15 may determine one or more sample values related to the first block 43a by using the reference samples 43c and 43d around the second block 43b including the first block 43a, and the reference samples 43c and 43d of the second block 43b which are used by the sample value determiner 16 may correspond to some of previously-reconstructed samples around the second block 43b. A characteristic of an operation by the sample value determiner 16 of the image decoding apparatus 15 may correspond to an operation by the sample value determiner 11 of the image encoding apparatus 10 described above with reference to FIG. 4C, thus, detailed descriptions thereof are omitted.

FIG. 4D is a diagram for describing a process of referring to previously-reconstructed samples from among samples adjacent to the first block 45a so as to determine at least one sample value related to the first block 45a included in the second block 45b, the process being performed by the image decoding apparatus 15, according to an embodiment. A characteristic of an operation by the image decoding apparatus 15 may correspond to an operation by the image encoding apparatus 10 described above with reference to FIG. 4D, thus, detailed descriptions thereof are omitted. FIG. 4E is a diagram for describing a process of determining at least one sample value related to the first block 46a by using a sample value of the reference sample 46c adjacent to the second block 46b including the first block 46a, the process being performed by the image decoding apparatus 15, according to an embodiment.

According to an embodiment, the sample value determiner 16 of the image decoding apparatus 15 may determine the at least one sample value related to the first block 46a by referring to the reference sample 46c around the first block 46a. The reference sample 46c around the first block 46a which is referable by the sample value determiner 16 may be previously-reconstructed samples that are not adjacent to the first block 46a as illustrated in FIG. 4A. A characteristic of an operation by the sample value determiner 16 of the image decoding apparatus 15 may correspond to an operation by the sample value determiner 11 of the image encoding apparatus 10 described above with reference to FIG. 4E, thus, detailed descriptions thereof are omitted.

However, the method of determining at least one sample value related to the first block by referring to only some of previously-reconstructed samples adjacent to the second block including the first block is merely an embodiment, thus, the method of determining at least one sample value is not limited to the embodiment and thus may be construed as various methods that are obvious to one of ordinary skill in the art.

In operation S212, the image decoding apparatus 15 may determine at least one pattern in which samples of the first block are to be arranged. A characteristic of operation S212 by the image decoding apparatus 15 may correspond to operation S202 by the image encoding apparatus 10, thus, detailed descriptions thereof are omitted.

In operation S214, according to an embodiment, the candidate prediction block generator 18 of the image decoding apparatus 15 may generate one or more candidate prediction blocks for the first block, based on the at least one sample value determined in operation S210 and the at least one pattern determined in operation S212.

According to an embodiment, the candidate prediction block generator 18 of the image decoding apparatus 15 may generate a candidate prediction block for each first block, based on at least one sample value and at least one pattern related to each block included in a frame forming an image. When a reference sample is determined based on a location of the second block including the first block (e.g., FIG. 4A, FIG. 4E, etc.), candidate prediction block groups with respect to one or more first blocks included in the second block may be equal to each other. However, when the reference sample is determined based on only the location of the first block (e.g., FIG. 3A, FIG. 3B, etc.) or when the reference sample is determined based on the locations of the first block and the second block (e.g., FIG. 4C, FIG. 4E, etc.), a sample value of the reference sample which is referred to by the first block may become difference according to the location of the first block, thus, candidate prediction block groups with respect to one or more first blocks included in the second block may be different from each other. Types of a candidate prediction block which may be generated may include candidate prediction blocks of the first block which are generated according to the aforementioned embodiments, however, the types of the candidate prediction block should not be construed as being limited to the embodiments and may be changed within the scope that is obvious to one of ordinary skill in the art.

In operation S216, according to an embodiment, the prediction value determiner 19 of the image decoding apparatus 15 may determine prediction values of the samples of the first block, based on one of the one or more candidate prediction blocks generated in operation S214.

According to an embodiment, the prediction value determiner 19 of the image decoding apparatus 15 may predict the samples of the first block by using one of the one or more candidate prediction blocks of the first block which are generated by the candidate prediction block generator 18. That is, the image decoding apparatus 15 may perform prediction on the first block by predicting the sample values of the first block to be similar to sample values of reference samples by referring to the reference samples that are previously reconstructed and are located adjacent to the first block or the second block including the first block.

According to an embodiment, the image decoding apparatus 15 may determine the prediction values of the samples of the first block by using the candidate prediction block determined, by the candidate prediction block generator 13 of the image encoding apparatus 10, to be the optimal candidate prediction block based on the rate-distortion cost. FIG. 4F is a diagram for describing a method of determining, based on one of one or more candidate prediction blocks, prediction values of samples of a first block from among one or more blocks included in the second block 47b, the method being performed by the image decoding apparatus 15, according to an embodiment.

According to an embodiment, the image decoding apparatus 15 may determine, based on one of one or more candidate prediction blocks, prediction values of samples of only the first block 47a that is at least one block from among a plurality of blocks included in the second block 47b. The image decoding apparatus 15 may use some methods of various image decoding methods of determining a prediction value of a first block when an image is decoded. The image decoding apparatus 10 may determine prediction values of samples of some of the plurality of blocks included in the second block 47b by using the image decoding method according to various embodiments, and may determine prediction values of samples of other blocks by using another image decoding method. A characteristic of an operation with reference to FIG. 4F by the image decoding apparatus 15 may correspond to an operation by the image encoding apparatus 10 described above with reference to FIG. 4F, thus, detailed descriptions thereof are omitted.

According to an embodiment, the image decoding apparatus 15 may include a bitstream obtainer (not shown) to obtain a bitstream including first information indicating whether to determine the prediction values of the samples of the first block by using one or more candidate prediction blocks, based on at least one of a block, a slice segment, a slice, and a picture. According to an embodiment, the image decoding apparatus 15 may obtain the bitstream including the first information indicating whether to determine the prediction values of the samples of the first block, based on a data unit corresponding to at least one of a block, a slice segment that may include the block, a slice that may include the slice segment, a frame that may include the slice, and a sequence that may include the frame. The image decoding apparatus 15 may obtain and parse the bitstream including the first information, and may determine whether the first block decoded by using one of various embodiments is included in the corresponding data unit.

According to an embodiment, the image decoding apparatus 15 may obtain the bitstream including the first information indicating whether to determine the prediction values of the samples of the first block by using the one or more candidate prediction blocks, based on at least one of a block, a slice segment, a slice, and a picture, and the first information may be information included in a syntax, a slice segment header, a slice header, a picture parameter set, or a sequence parameter set with respect to a block unit (e.g., a coding unit or a prediction unit as a data processing unit for decoding).

According to an embodiment, the first information indicating whether to determine the prediction values of the samples of the first block may include information indicating which candidate prediction block was used in determining the prediction values of the samples of the first block. That is, the image decoding apparatus 15 may obtain a bitstream including the first information including distinguishment information for distinguishing between one or more patterns by which the samples of the first block are to be arranged, or information about an index. The prediction value determiner 19 of the image decoding apparatus 15 may select, based on the obtained first information, one of the one or more candidate prediction blocks generated by the candidate prediction block generator 18, and may determine the prediction values of the samples of the first block.

According to an embodiment, the pattern determiner 17 of the image decoding apparatus 15 may determine one of the one or more patterns by which the samples of the first block are to be arranged, based on the distinguishment information or the information about an index about a pattern used in determining prediction values of blocks that are adjacent to the first block and are previously reconstructed, and may determine the prediction values of the samples of the first block based on the determined pattern. When there is an adjacent block of which prediction value has been determined by using one of candidate prediction blocks having various patterns so as to determine the prediction values of the samples of the first block, the first block is highly likely to include samples having a pattern of the candidate prediction block, so that an efficient decoding process may be performed by using a pattern corresponding to a process of predicting sample values of the blocks adjacent to the first block.

FIG. 5 illustrates a flat filtering process between a plurality of first blocks including predicted sample values, the flat filtering process being performed by the image decoding apparatus 15, according to an embodiment.

In more detail, FIG. 5 illustrates an example in which prediction values of samples of a first block are determined and then flat filtering is performed on a boundary between the first blocks.

The second block 50 includes the four first blocks 51, 52, 53, and 54. In this regard, the first blocks 51, 52, 53, and 54 may each correspond to a prediction unit as a data processing unit to be used in a prediction process while an image is decoded, and the second block 50 may correspond to a coding unit that may include at least one prediction unit. Since the first blocks 51, 52, 53, and 54 are predicted by different prediction modes, continuity of samples located on boundaries between the first blocks 51, 52, 53, and 54 may be small. Thus, by performing flat filtering on the samples located on the boundaries between the first blocks 51, 52, 53, and 54, continuity of the samples may be increased.

The flat filtering may be performed by using various methods according to three conditions. As the first condition, the flat filtering may be differently performed according to how far the flat filtering is to be applied to samples distant from the boundaries between the first blocks 51, 52, 53, and 54. For example, the flat filtering may be performed only on samples close to the boundaries between the first blocks 51, 52, 53, and 54. As another example, the flat filtering may be performed on samples that are distant by two samples from the boundaries between the first blocks 51, 52, 53, and 54. As another example, a range of samples by which the flat filtering is to be performed by be determined according to a size of the first blocks 51, 52, 53, and 54.

As the second condition, the flat filtering may be differently applied according to the number of taps of a filter to be used. For example, when a three-tap filter is used, a sample on which the flat filtering is to be performed is filtered according to a sample located at the left of the sample and a sample located at the right of the sample. As another example, when a five-tap filter is used, a sample on which the flat filtering is to be performed is filtered according to two samples located at the left of the sample and two samples located at the right of the sample.

As the third condition, the flat filtering may be differently applied according to filter coefficients of a filter to be used. In the case of the three-tap filter, filter coefficients may be determined to be [a1, a2, a3]. When a2 is increased compared to a1 and a3, strength of filtering may be decreased. In the case of the five-tap filter, filter coefficients may be determined to be [a1, a2, a3, a4, a5]. When a3 is increased compared to a1, a2, a4, and a5, strength of filtering may be decreased. For example, filtering strength of the five-tap filter of which filter coefficients are [1 4 6 4 1] is higher than filtering strength of the five-tap filter of which filter coefficients are [1 2 10 2 1].

According to the embodiment illustrated in FIG. 5, the flat filtering may be performed on samples 55 adjacent to the boundaries between the first blocks 51, 52, 53, and 54. Since the flat filtering is performed on the samples 55 adjacent to the boundaries, continuity of samples included in the second block 50 may be increased.

FIG. 6 is a diagram for describing a method of transforming the second block 60 including prediction values of samples of the plurality of first blocks 61, 62, 63, and 64.

In this regard, the first blocks 61, 62, 63, and 64 may each correspond to a prediction unit as a data processing unit to be used in a prediction process while an image is decoded, and the second block 60 may correspond to a coding unit that may include at least one prediction unit. In addition, a transformation unit that is a data unit for transforming samples included in the second block 60 may be defined to be a third block 65. Hereinafter, for convenience of description, it is assumed that the first blocks 61, 62, 63, and 64 are prediction units, the second block 60 is a coding unit, and the third block 65 is a transformation unit.

According to an embodiment, in FIG. 6, sizes of the coding unit 60 and the transformation unit 65 are equal to 2N×2N, and a size of each of the prediction units 61, 62, 63, and 64 is N×N.

According to the related art, in an intra prediction process in which prediction is performed by referring to reconstructed samples adjacent to a prediction unit, intra prediction may not be performed on all of the prediction units 61, 62, 63, and 64 in the transformation unit 65. Since the intra prediction and transformation are performed on all samples, based on the transformation unit 65, even if samples included in the prediction unit 61 include prediction values, prediction values of samples included in other prediction units 62, 63, and 64 are not yet determined so that transformation on the samples that already include the prediction values and are included in the prediction unit 61 may not be possible.

However, according to various embodiments including FIGS. 4A, 4B, and 4C, the prediction units 61, 62, 63, and 64 may be predicted based on reference samples adjacent to the coding unit 60 so that all samples included in the transformation unit 65 may be predicted in parallel. That is, the prediction units 61, 62, 63, and 64 may be included in the coding unit 60, and according to an embodiment, the image decoding apparatus 15 may determine prediction values of samples of the prediction units 61, 62, 63, and 64 included in the coding unit 60 by using previously-reconstructed reference samples adjacent to the coding unit 60. Thus, according to an embodiment, even when the transformation unit 65 is larger than each of the prediction units 61, 62, 63, and 64, the image encoding apparatus 10 may perform transformation by determining a prediction value of a sample included in each of prediction units by referring to the previously-reconstructed reference samples adjacent to the coding unit 60. According to an embodiment, prediction on prediction units and generation of a residual signal with respect to transformation units may be independently performed in parallel. Also, there is a high probability that continuity of reference samples, which are distance from a prediction unit, and samples included in the prediction unit is maintained in a high-resolution image, efficient image encoding may be possible in the high-resolution image.

Figure 7:
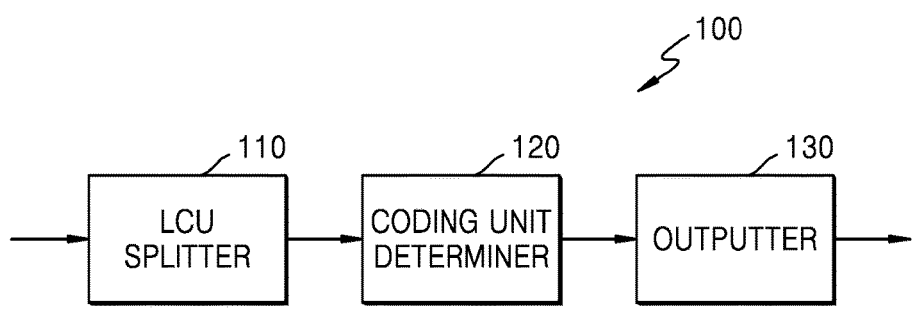
FIG. 7 illustrates a block diagram of a video encoding apparatus based on coding units according to a tree structure, according to an embodiment.

FIG. 7 illustrates a block diagram of a video encoding apparatus based on coding units of a tree structure 100, according to an embodiment. The video encoding apparatus 100 in FIG. 7 may correspond to the image encoding apparatus 10 in FIG. 1A. In addition, prediction by the video encoding apparatus 100 based on an intra mode may correspond to the intra prediction described above with reference to FIGS. 1A and 2A.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be determined for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to locations in the one largest coding unit, and thus the final depths may differ according to regions in the image data. Thus, one or more final depths may be determined in one largest coding unit, and the data of the largest coding unit may be divided according to coding units of at least one final depth.

Accordingly, the coding unit determiner 120 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding including the prediction encoding and the transformation has to be performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations such as prediction encoding, transformation, and entropy encoding are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. A partition obtained by splitting a prediction unit may include a coding unit and a data unit obtained by splitting at least one of a height and a width of the coding unit. A partition may include a data unit obtained by splitting a coding unit, and a data unit having the same size as the coding unit. A partition that is a base of prediction may be referred to as a 'prediction unit'.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode according to an embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a minimum encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail below with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and split information according to the depth, in bitstreams.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined in consideration of characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 8:
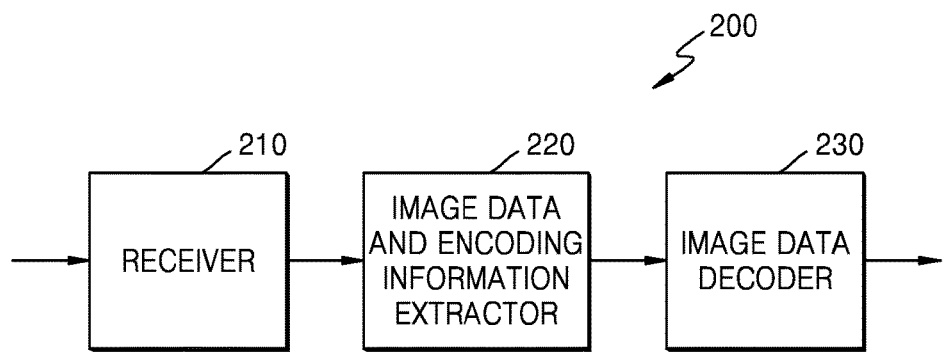
FIG. 8 illustrates a block diagram of a video decoding apparatus based on coding units according to a tree structure, according to an embodiment.

FIG. 8 illustrates a block diagram of a video decoding apparatus based on coding units of a tree structure, according to various embodiments. The video decoding apparatus 200 in FIG. 8 may correspond to the image decoding apparatus 15 in FIG. 1B. In addition, intra prediction performed by the video decoding apparatus 200 may correspond to the intra prediction described above with reference to FIGS. 1B and 2B.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of split information for decoding operations of the video decoding apparatus 200 according to the embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bit stream is split into the largest coding unit so that the image data decoder 230 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

In order to reconstruct first layer images and second layer images by decoding a received first layer image stream and a received second layer image stream, the video decoding apparatuses 200 corresponding to the number of views may be included.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 9:
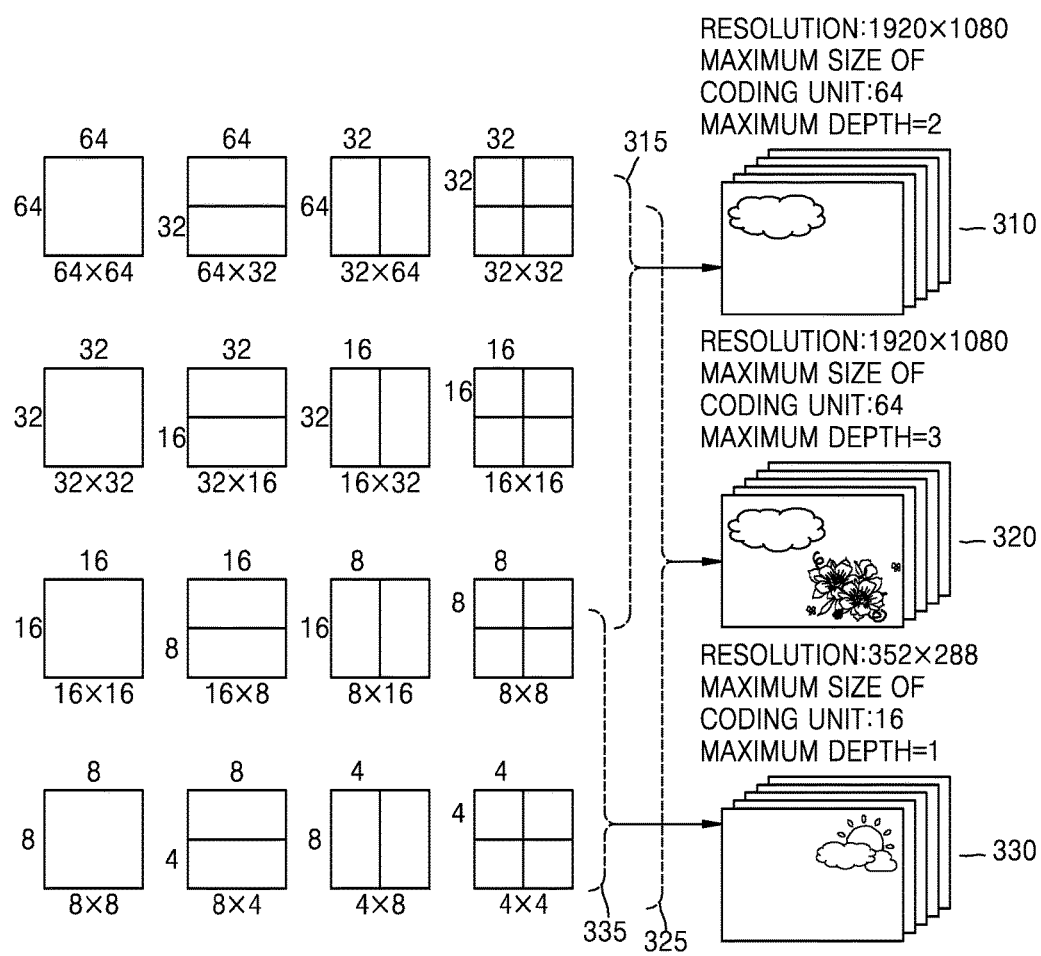
FIG. 9 illustrates a concept of coding units, according to an embodiment.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to three layers by splitting the largest coding unit three times. As a depth deepens, detailed information may be precisely expressed.

Figure 10:
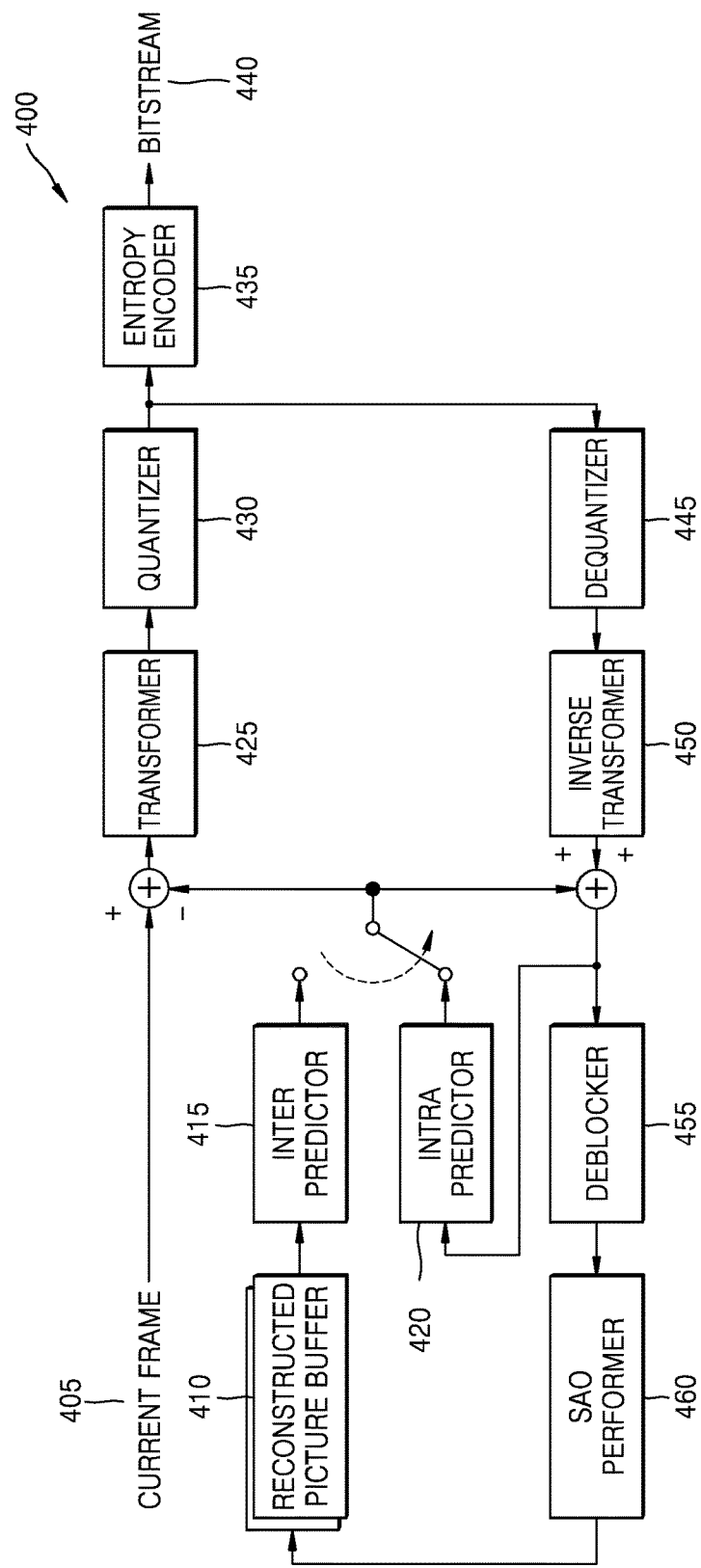
FIG. 10 illustrates a block diagram of an image encoder based on coding units, according to an embodiment.

FIG. 10 illustrates a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed to residual data in a spatial domain through an inverse quantizer 445 and an inverse transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The reconstructed image is stored in the reconstructed picture buffer 410. The reconstructed images stored in the reconstructed picture buffer 410 may be used as reference images for inter predicting another image. The quantized transformation coefficient obtained through the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine partitions and a prediction mode of each coding unit from among the coding units having a tree structure while considering the maximum size and the maximum depth of a current largest coding unit, and the transformer 425 may determine whether to split a transformation unit according to a quad-tree in each coding unit from among the coding units having the tree structure.

Figure 11:
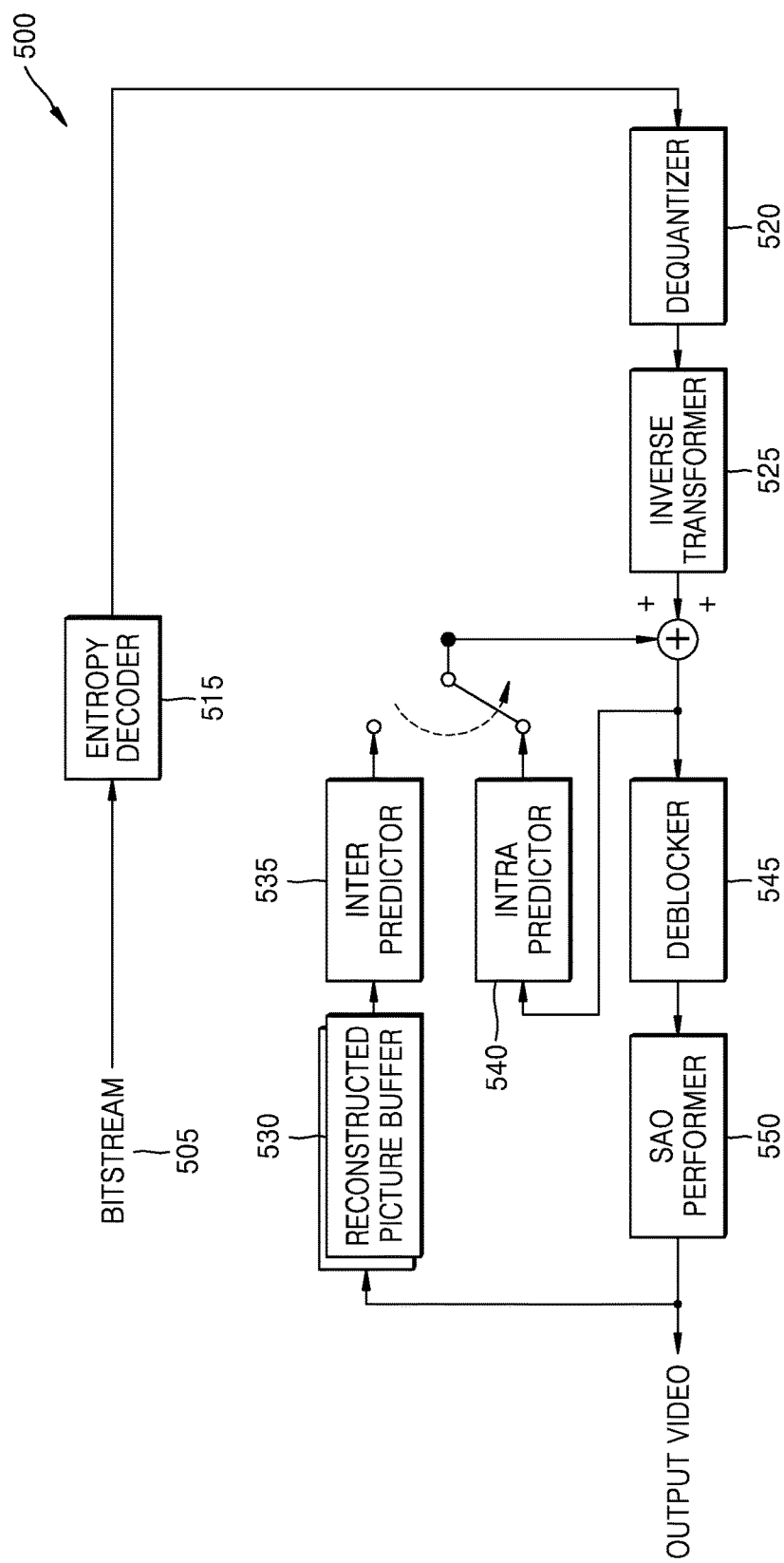
FIG. 11 illustrates a block diagram of an image decoder based on coding units, according to an embodiment.

FIG. 11 illustrates a block diagram of an image decoder 500 based on coding units, according to various embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 reconstructs residual data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Also, reconstructed images that are stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the SAO performer 550 may perform operations based on coding units having a tree structure for each largest coding unit.

In particular, the intra prediction 540 and the inter predictor 535 determine a partition mode and a prediction mode according to each of coding units having a tree structure, and the inverse transformer 525 may determine whether to split a transformation unit according to a quad-tree structure per coding unit.

The encoding operation of FIG. 10 and the decoding operation of FIG. 11 describe each of videostream encoding and decoding operations in a single layer, respectively. Thus, if the image encoding apparatus 10 of FIG. 1A encodes a videostream of at least two layers, an encoder 12 may be included according to each of the layers.

Figure 12:
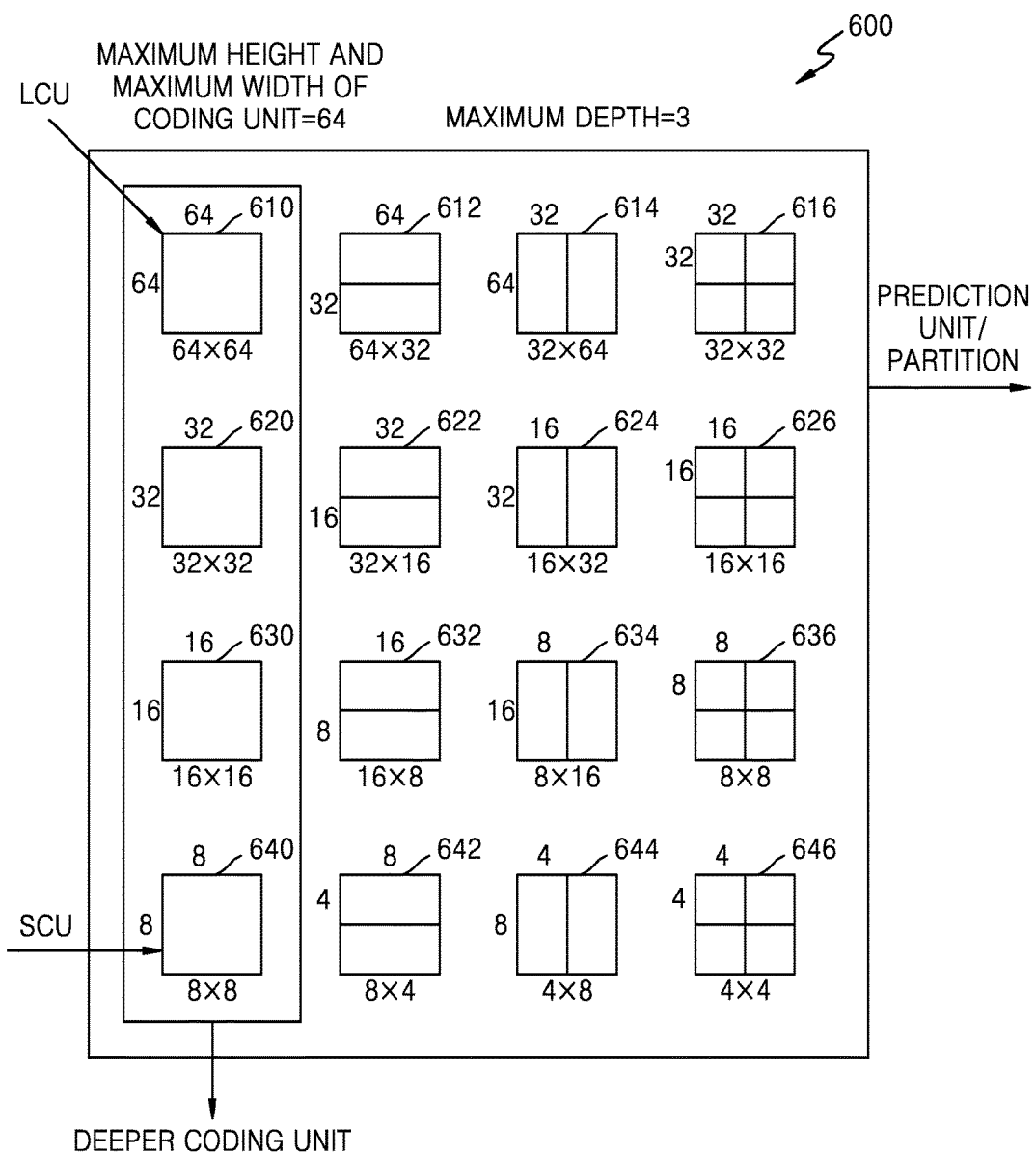
FIG. 12 illustrates deeper coding units according to depths, and partitions, according to an embodiment.

FIG. 12 illustrates deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the coding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition having the minimum encoding error in the largest coding unit 610 may be selected as the depth and a partition mode of the largest coding unit 610.

Figure 13:
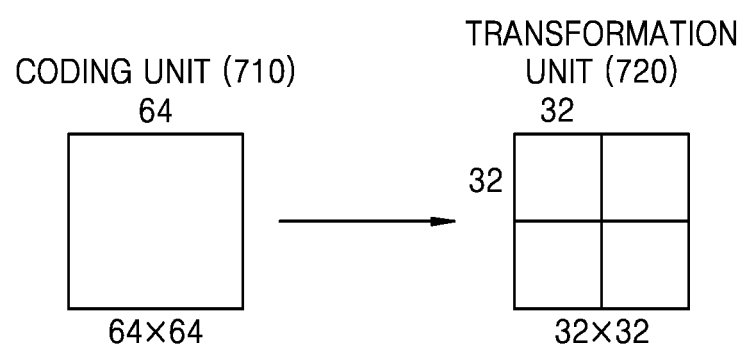
FIG. 13 illustrates a relationship between a coding unit and transformation units, according to an embodiment.

FIG. 13 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 14:
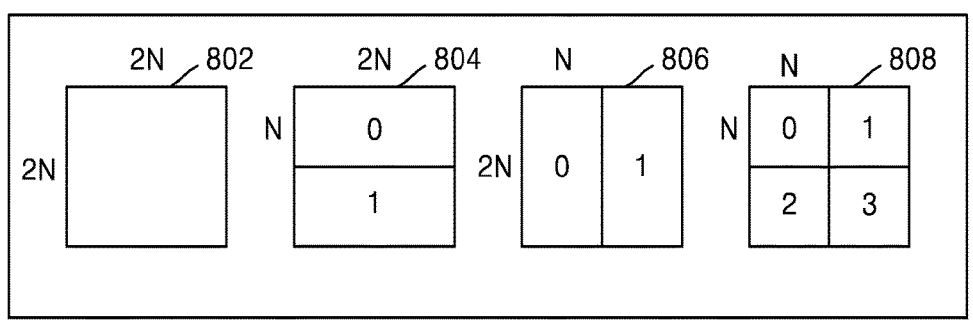
FIG. 14 illustrates a plurality of pieces of encoding information according to depths, according to an embodiment.
Figure 14:
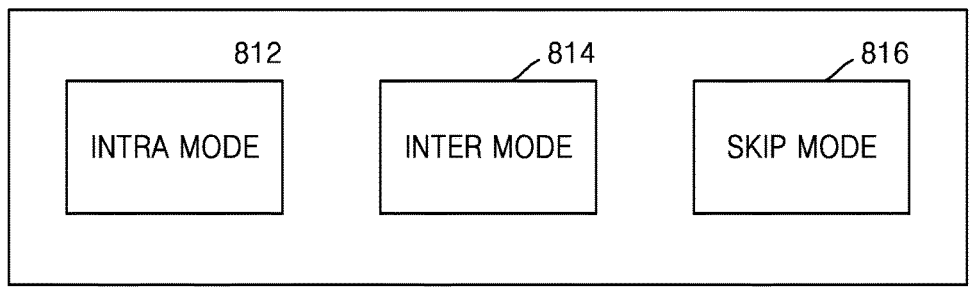
Figure 14:
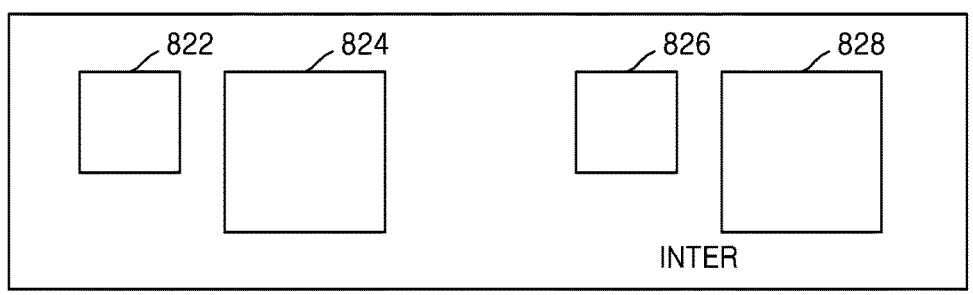

FIG. 14 illustrates a plurality of pieces of encoding information, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for each deeper coding unit.

Figure 15:
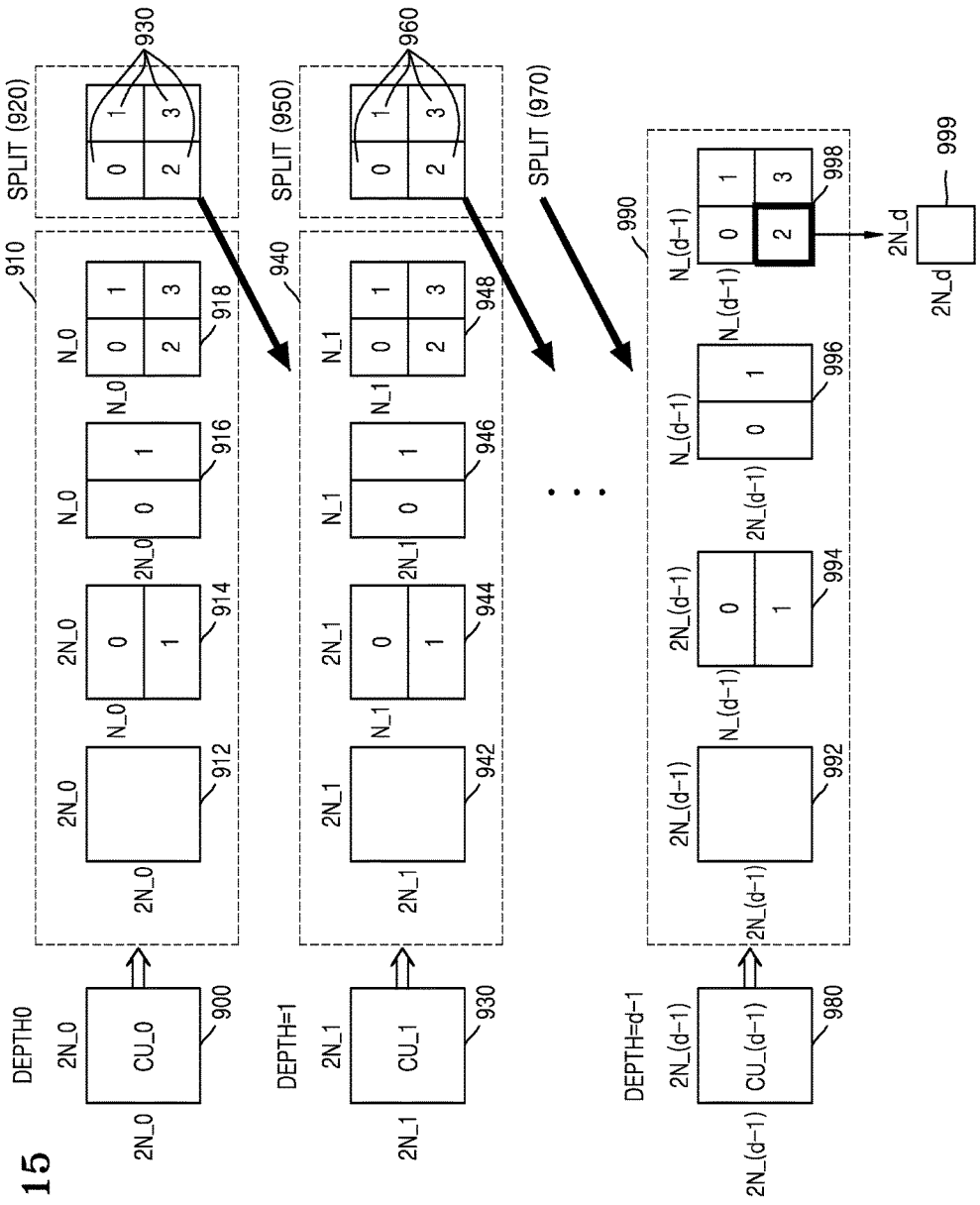
FIG. 15 illustrates deeper coding units according to depths, according to an embodiment.

FIG. 15 illustrates deeper coding units according to depths, according to various embodiments.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 16:
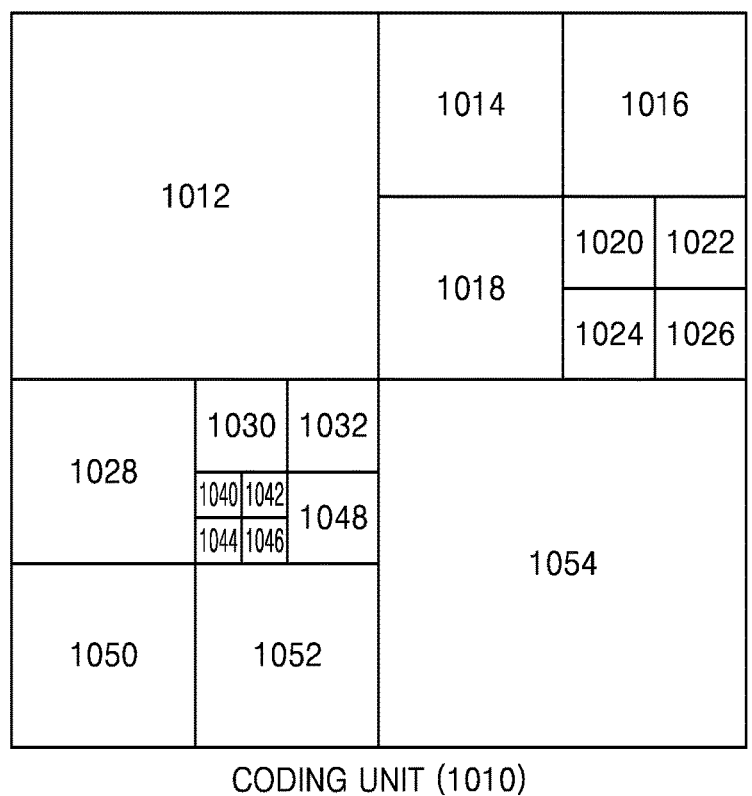
FIGS. 16, 17, and 18 illustrate a relationship between coding units, prediction units, and transformation units, according to an embodiment.
Figure 17:
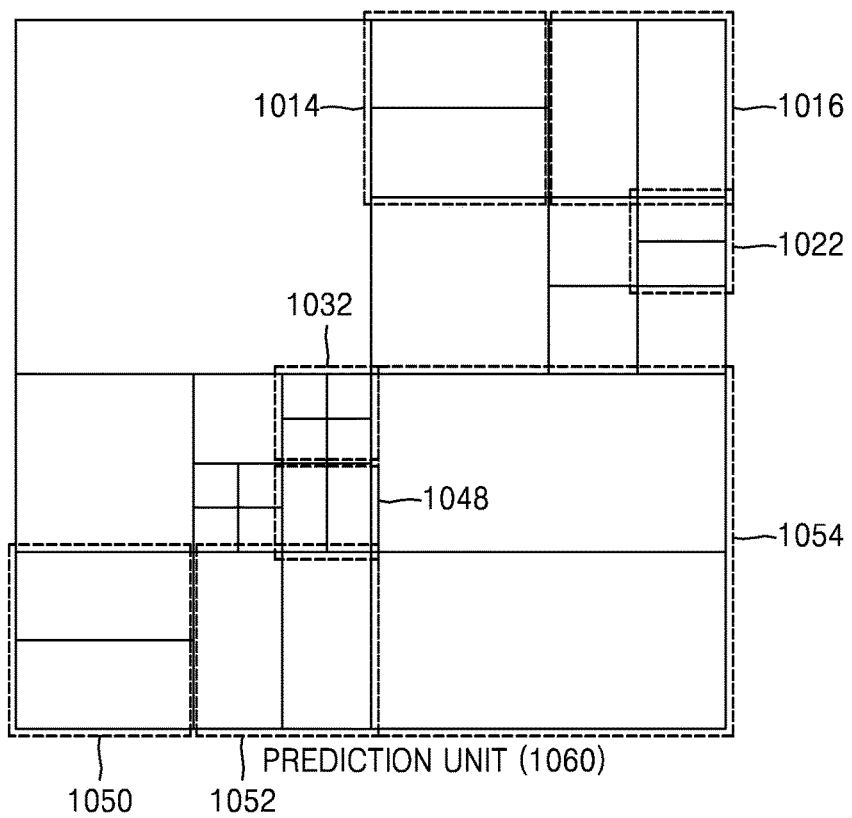
Figure 18:
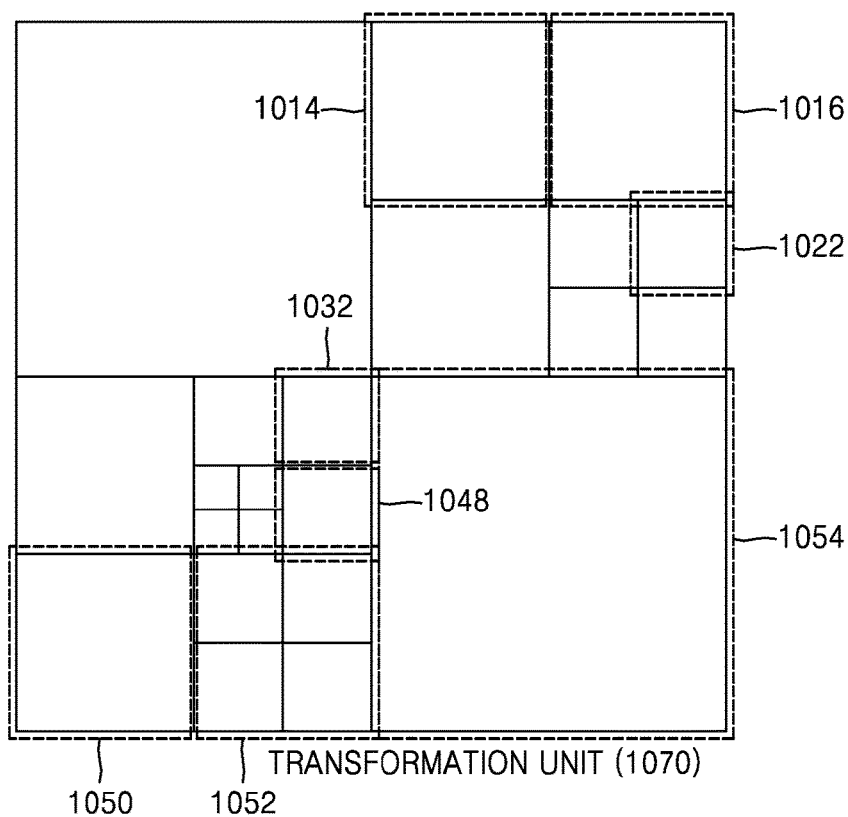

FIGS. 16, 17, and 18 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the Coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

| | Split Information 0 (Encoding on Coding Unit having Size of 2N × 2N and Current Depth of d) | | | | Split Information 1 |
|---|---|---|---|---|---|
| Prediction Mode | Partition Mode | | Size of Transformation Unit | | Repeatedly Encode Coding Units having Lower Depth of d + 1 |
| Intra Inter Skip (Only 2N × 2N) | Symmetrical Partition Mode | Asymmetrical Partition Mode | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 19:
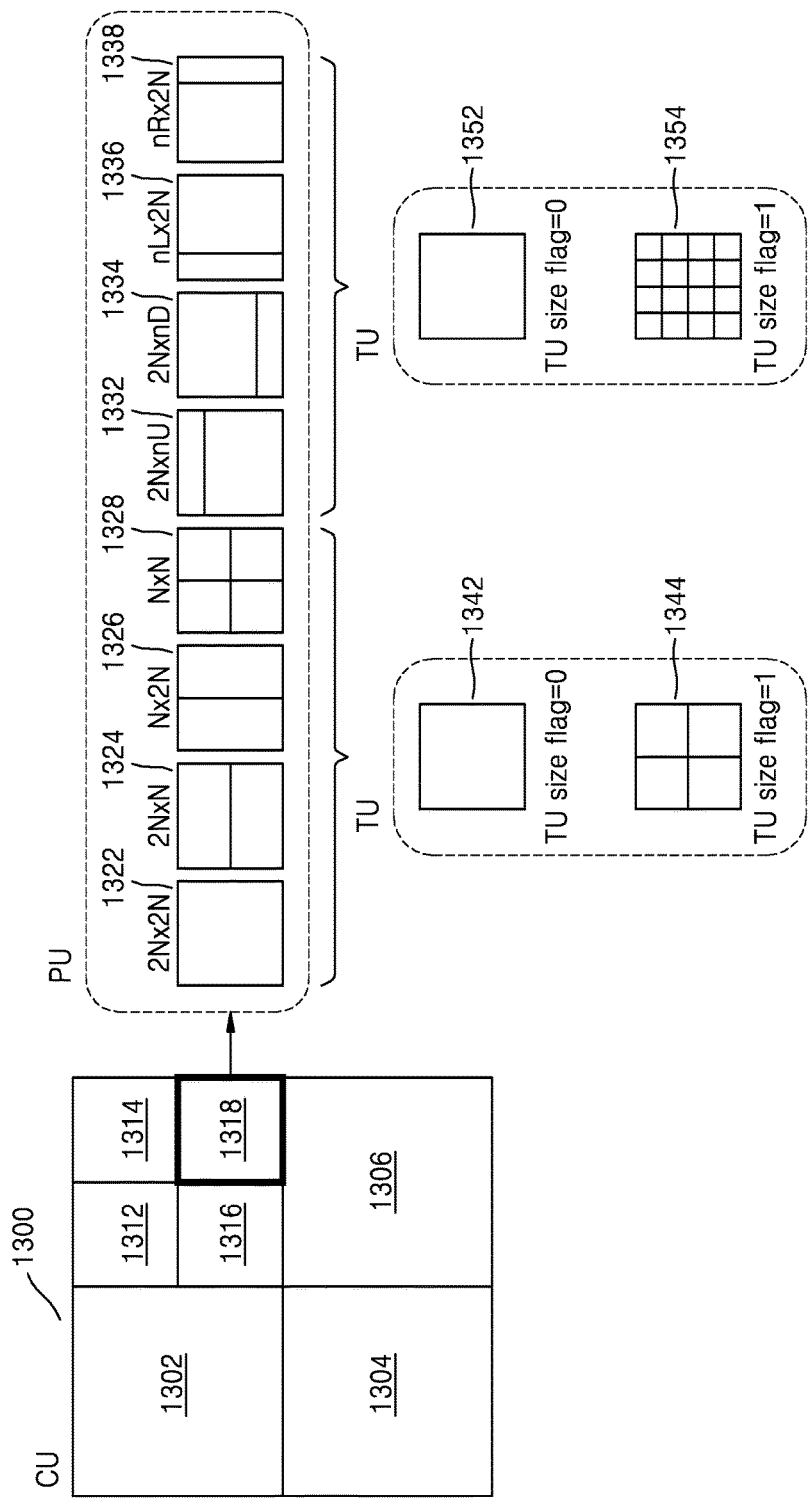
FIG. 19 illustrates a relationship between a coding unit, a prediction unit, and a transformation unit, according to encoding mode information of Table 1.

FIG. 19 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 19 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. Split information (TU size flag) of a transformation unit may be an example of a transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 9 through 19, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the image encoding methods and/or the video encoding method, which are described with reference to FIGS. 1A through 19, will be collectively referred to as 'the video encoding method'. Also, the image decoding methods and/or the video decoding method, which are described with reference to FIGS. 1A through 19, will be collectively referred to as 'the video decoding method'.

Also, a video encoding apparatus including the image encoding apparatus 40, the video encoding apparatus 100, or the image encoder 400 which are described with reference to FIGS. 1A through 19 will be collectively referred to as a 'video encoding apparatus'. Also, a video decoding apparatus including the image decoding apparatus 30, the video decoding apparatus 200, or the image decoder 500 which are described with reference to FIGS. 1A through 20 will be collectively referred to as a 'video decoding apparatus'.

A non-transitory computer-readable recording medium such as a disc 26000 that stores the programs according to an embodiment will now be described in detail.

Figure 20:
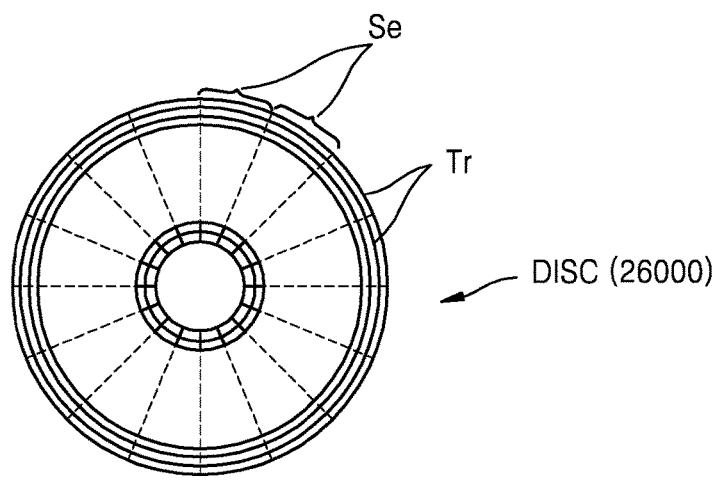
FIG. 20 illustrates a physical structure of a disc in which a program is stored, according to an embodiment.

FIG. 20 illustrates a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 21:
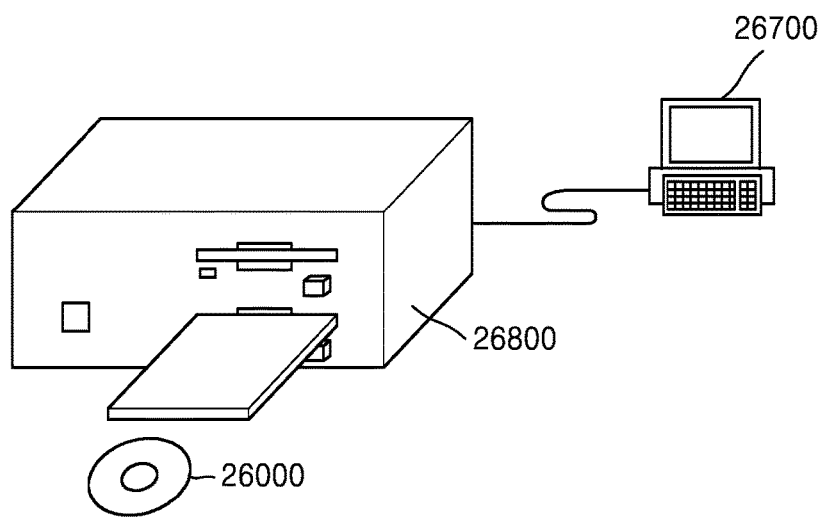
FIG. 21 illustrates a disc drive for recording and reading a program by using the disc.

FIG. 21 illustrates a disc drive 26800 for recording and reading a program by using the disc 26000. A computer system 26700 may store a program that executes at least one of the video encoding method and the video decoding method according to an embodiment, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of the video encoding method and the video decoding method according to an embodiment may be stored not only in the disc 26000 illustrated in FIGS. 20 and 21 but may also be stored in a memory card, a ROM cassette, or a solid state drive (SSD).

A system to which the video encoding method and the video decoding method described above are applied will be described below.

Figure 22:
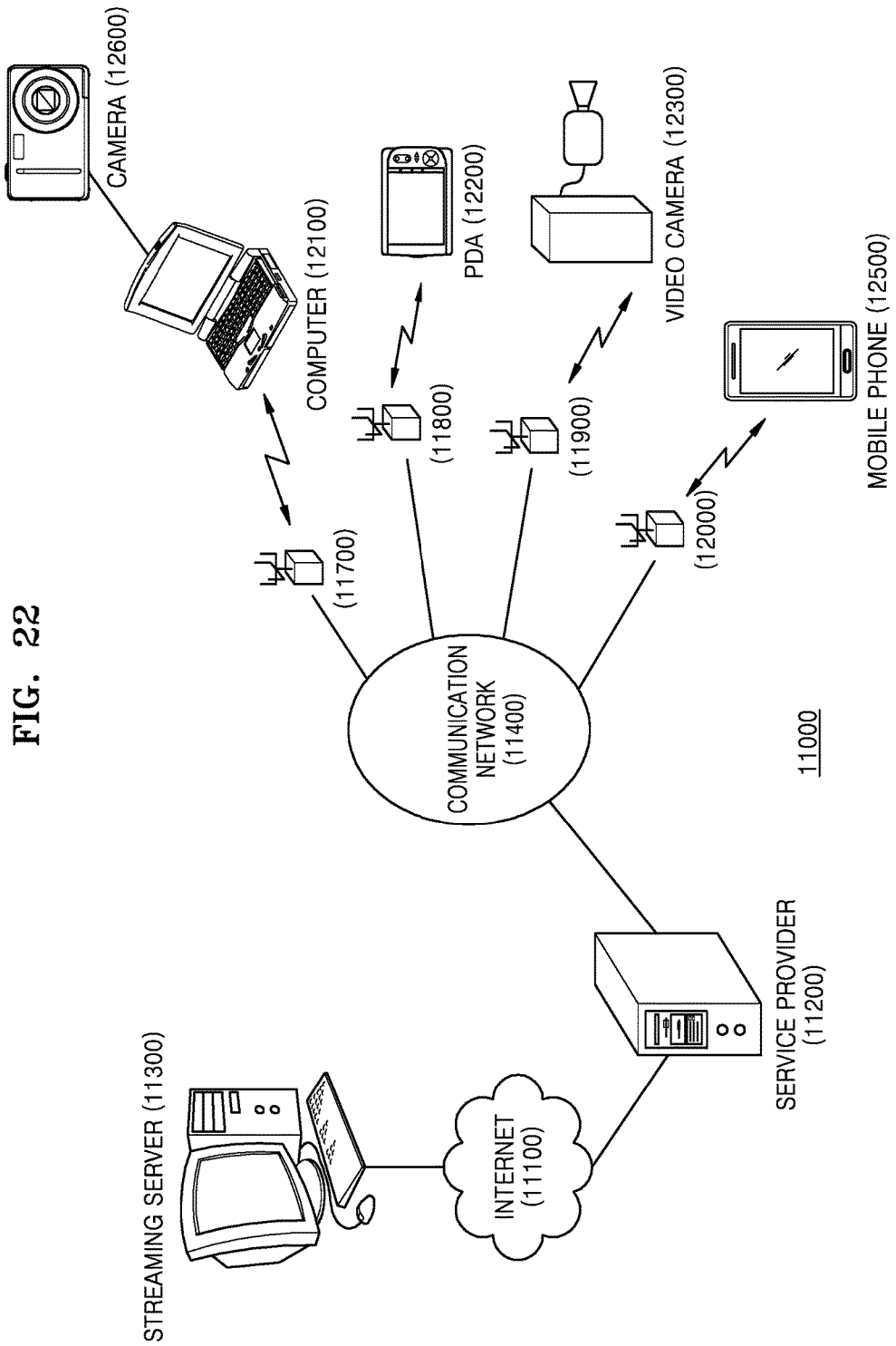
FIG. 22 illustrates an overall structure of a content supply system for providing a content distribution service.

FIG. 22 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus according to an embodiment.

Figure 23:
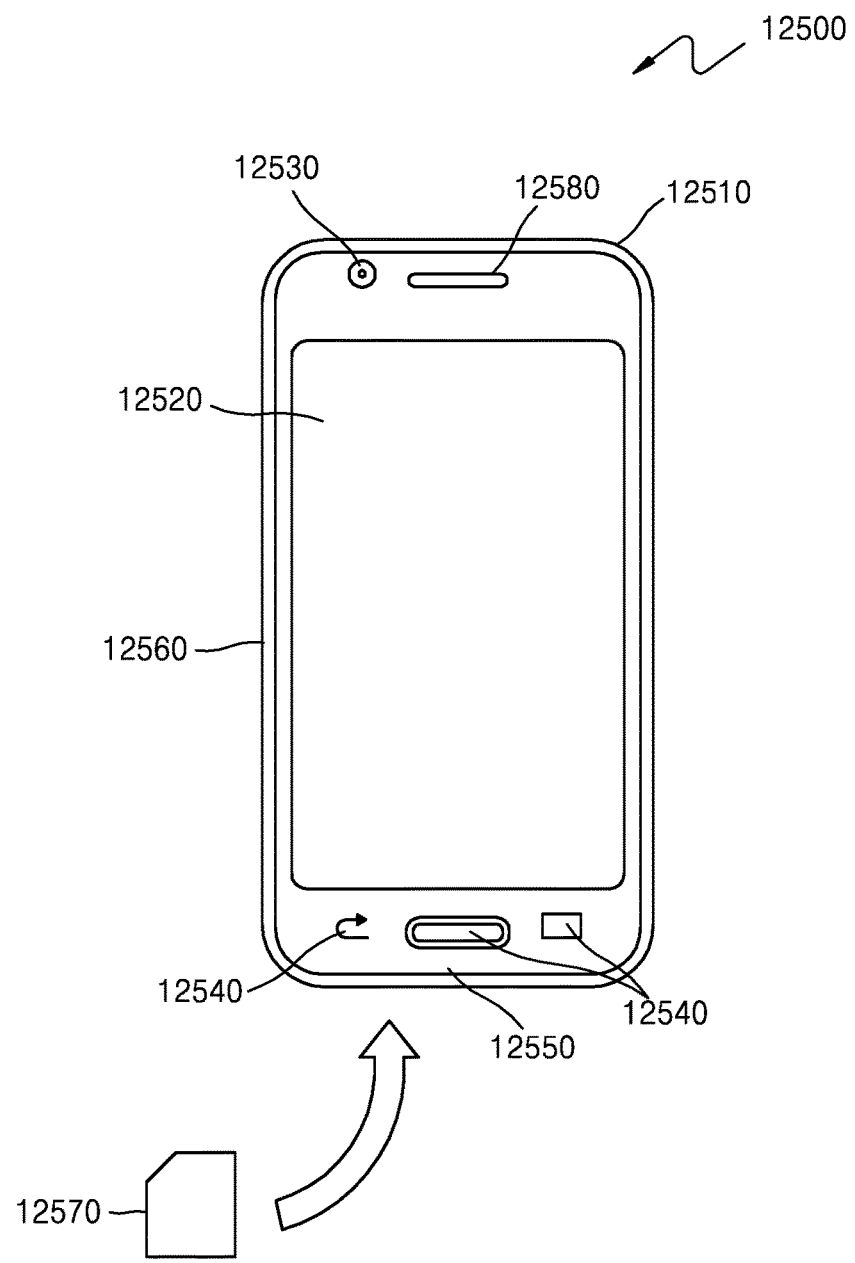
FIGS. 23 and 24 illustrate external and internal structures of a mobile phone to which a video encoding method and a video decoding method are applied, according to an embodiment.
Figure 24:
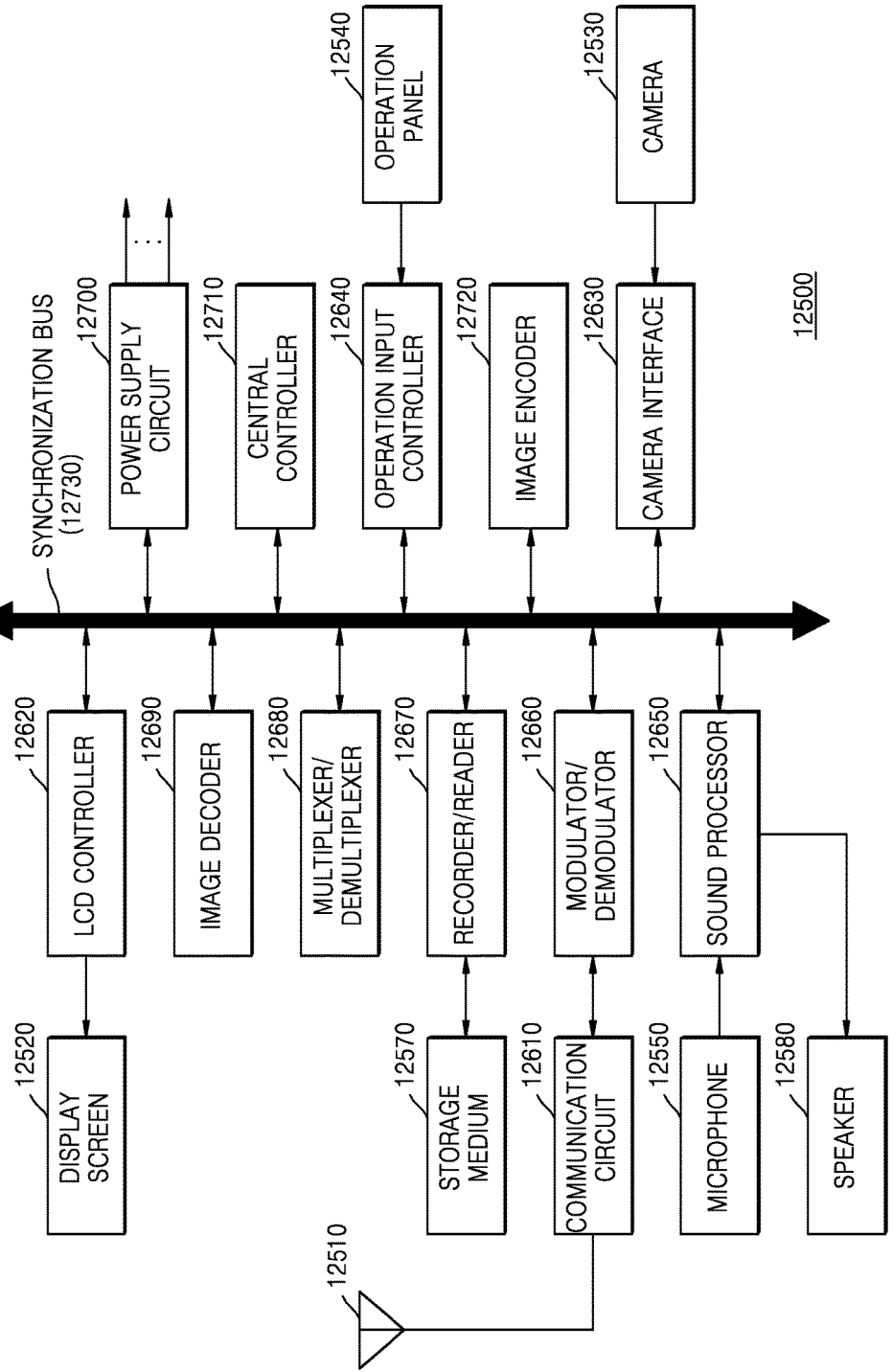

With reference to FIGS. 23 and 24, the mobile phone 12500 included in the content supply system 11000 according to an embodiment will now be described in detail.

FIG. 23 illustrates an external structure of the mobile phone 12500 to which the video encoding method and the video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 24 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The digital sound signal may be converted to a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 according to an embodiment. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus according to an embodiment, or may be a receiving terminal including only the video decoding apparatus according to an embodiment.

Figure 25:
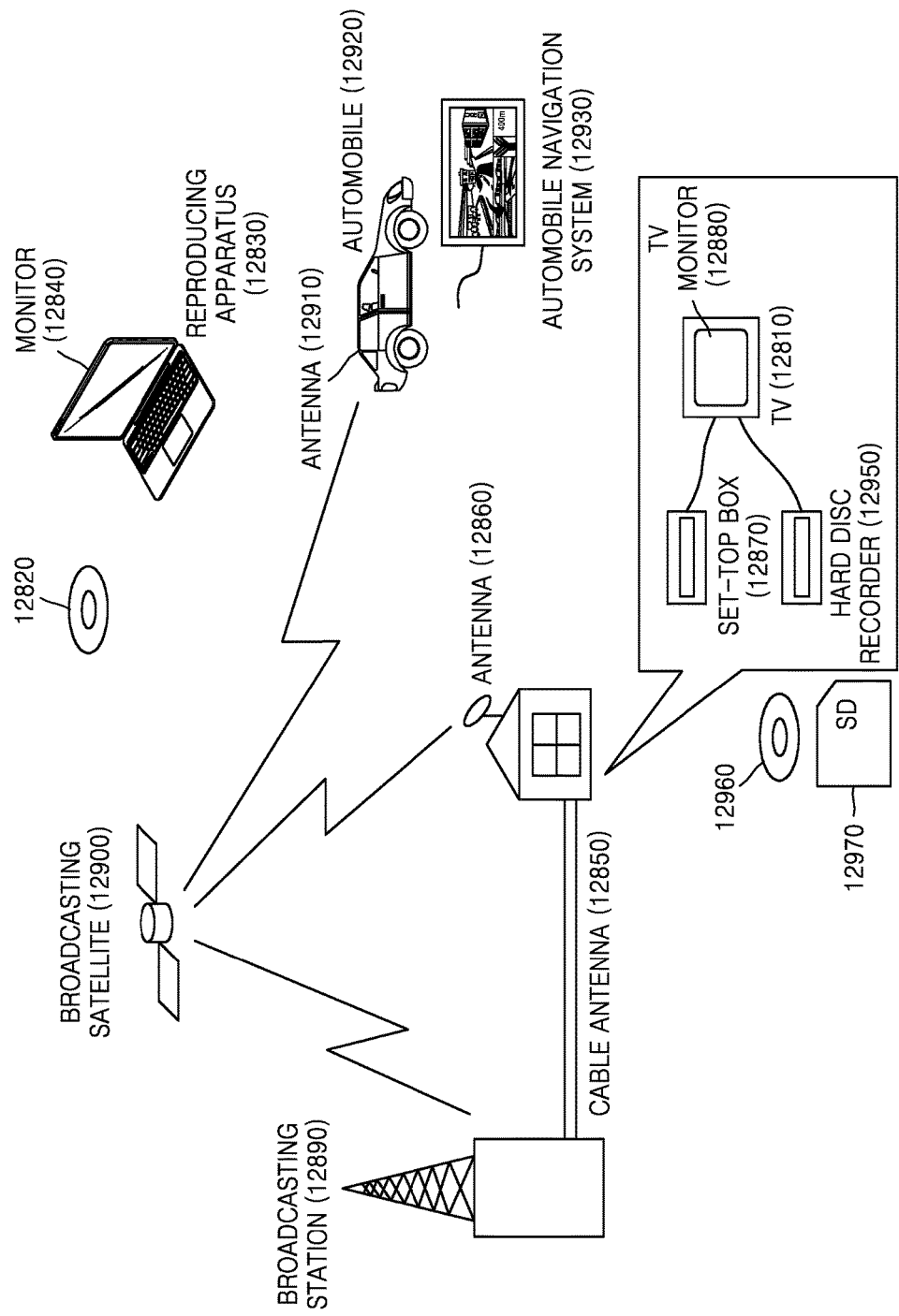
FIG. 25 illustrates a digital broadcasting system employing a communication system, according to an embodiment.

A communication system according to an embodiment is not limited to the communication system described above with reference to FIG. 24. For example, FIG. 25 illustrates a digital broadcasting system employing a communication system, according to various embodiments. The digital broadcasting system of FIG. 25 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to an embodiment is implemented in a reproducing apparatus 12130, the reproducing apparatus 12130 may parse and decode an encoded video stream recorded on a storage medium 12120, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to an embodiment may be installed. Data output from the set-top box 12870 may also be reproduced on a TV monitor 12880.

As another example, the video decoding apparatus according to an embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12230 installed in the automobile 12220.

A video signal may be encoded by the video encoding apparatus according to an embodiment and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to an embodiment, a video signal recorded on the DVD disc 12960, the SD card 12970, or another storage medium may be reproduced on the TV monitor 12880.

Figure 26:
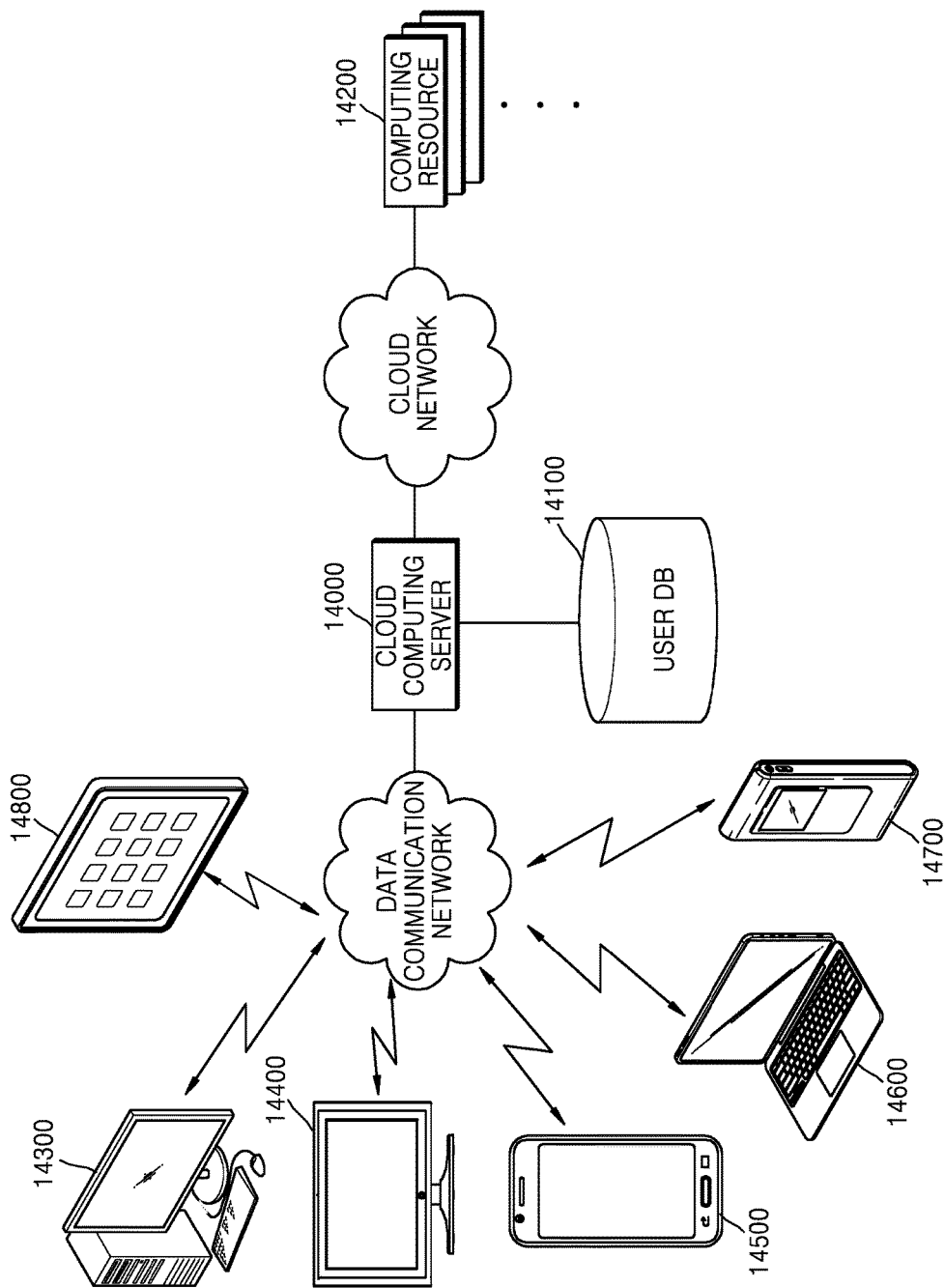
FIG. 26 illustrates a network structure of a cloud computing system using the video encoding apparatus and the video decoding apparatus, according to an embodiment.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

FIG. 26 illustrates a network structure of a cloud computing system using the video encoding apparatus and the video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and may provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

Here, the user terminal may include the video decoding apparatus according to an embodiment as described above with reference to FIGS. 1A through 19. As another example, the user terminal may include the video encoding apparatus according to an embodiment as described above with reference to FIG. 1A through 20. Alternatively, the user terminal may include both the video encoding apparatus and the video decoding apparatus according to an embodiment as described above with reference to FIGS. 1A through 19.

Various applications of the image encoding method, the image decoding method, the image encoding apparatus, and the image decoding apparatus described above with reference to FIGS. 1A through 19 are described above with reference to FIGS. 20 through 26. However, various embodiments of methods of storing the video encoding method and the video decoding method in a storage medium or various embodiments of methods of implementing the video encoding apparatus and the video decoding apparatus in a device described above with reference to FIGS. 1A through 19 are not limited to the embodiments of FIGS. 20 through 26.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:
1. An image encoding method comprising:
  determining at least one sample value related to a first block, based on sample values of previously-reconstructed reference samples;
  determining at least one pattern in which samples of the first block are to be arranged;
  generating one or more candidate prediction blocks for the first block, based on the at least one sample value and the at least one pattern; and determining prediction values of the samples of the first block, based on one of the one or more candidate prediction blocks.

2. The image encoding method of claim 1, wherein the determining of the at least one sample value comprises determining the at least one sample value by using the previously-reconstructed reference samples located adjacent to the first block.

3. The image encoding method of claim 2, wherein the reference samples comprising the previously-reconstructed reference samples are comprised in at least one block from among adjacent blocks of the first block or a second block comprising the first block.

4. The image encoding method of claim 1, wherein the determining of the at least one pattern comprises:
   determining a location of a sample having the at least one sample value in the first block; and
   determining sample values and locations of other samples comprised in the first block, based on the location of the sample.

5. The image encoding method of claim 1, further comprising generating a bitstream comprising first information indicating whether to determine the prediction values by using the one or more candidate prediction blocks, based on at least one of a block, a slice segment, a slice, a frame, and a sequence.

6. The image encoding method of claim 1, further comprising performing flat filtering on at least one adjacent block close to the first block, and samples adjacent to a boundary of the first block.

7. An image decoding method comprising:
   determining at least one sample value related to a first block, based on sample values of previously-reconstructed reference samples;
   determining at least one pattern in which samples of the first block are to be arranged;
   generating one or more candidate prediction blocks for the first block, based on the at least one sample value and the at least one pattern; and
   determining prediction values of the samples of the first block, based on one of the one or more candidate prediction blocks.

8. The image decoding method of claim 7, wherein the determining of the at least one sample value comprises determining the at least one sample value by using the previously-reconstructed reference samples located adjacent to the first block.

9. The image decoding method of claim 8, wherein the reference samples comprising the previously-reconstructed reference samples are comprised in at least one block from among adjacent blocks of the first block or a second block comprising the first block.

10. The image decoding method of claim 7, wherein the determining of the at least one pattern comprises:
    determining a location of a sample having the at least one sample value in the first block; and
    determining sample values and locations of other samples comprised in the first block, based on the location of the sample.

11. The image decoding method of claim 7, further comprising obtaining a bitstream comprising first information indicating whether to determine the prediction values by using the one or more candidate prediction blocks, based on at least one of a block, a slice segment, a slice, a frame, and a sequence.

12. The image decoding method of claim 8, further comprising performing flat filtering on at least one adjacent block close to the first block, and samples adjacent to a boundary of the first block.

13. An image decoding apparatus comprising:
    a sample value determiner configured to determine at least one sample value related to a first block, based on sample values of previously-reconstructed reference samples;
    a pattern determiner configured to determine at least one pattern in which samples of the first block are to be arranged;
    a candidate prediction block generator configured to generate one or more candidate prediction blocks for the first block, based on the at least one sample value and the at least one pattern; and
    a prediction value determiner configured to determine prediction values of the samples comprised in the first block, based on one of the one or more candidate prediction blocks.

14. A non-transitory computer-readable recording medium comprising a program for implementing the image decoding method of claim 7.

* * * * *